US011890909B2

(12) United States Patent
Furuta

(10) Patent No.: US 11,890,909 B2
(45) Date of Patent: Feb. 6, 2024

(54) VIBRATION DAMPING CONTROL APPARATUS

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 303 days.

(21) Appl. No.: 17/487,284

(22) Filed: Sep. 28, 2021

(65) Prior Publication Data

US 2022/0134833 A1 May 5, 2022

(30) Foreign Application Priority Data

Oct. 30, 2020 (JP) ................................. 2020-182930

(51) Int. Cl.
*B60G 17/0165* (2006.01)
*B60G 17/018* (2006.01)
(52) U.S. Cl.
CPC ....... *B60G 17/0165* (2013.01); *B60G 17/018* (2013.01); *B60G 2400/102* (2013.01); *B60G 2400/252* (2013.01); *B60G 2400/821* (2013.01); *B60G 2500/10* (2013.01)
(58) Field of Classification Search
CPC .......................... B60G 17/0165; B60G 17/018; B60G 17/015; B60G 2400/821; B60G 2500/10
See application file for complete search history.

(56) References Cited

U.S. PATENT DOCUMENTS

| 2002/0045977 | A1* | 4/2002 | Uchiyama | ........ B60G 17/01908 |
| | | | | 280/5.515 |
| 2015/0343873 | A1* | 12/2015 | Maise | ................ B60G 17/0165 |
| | | | | 701/2 |
| 2017/0320368 | A1* | 11/2017 | Masamura | ........... B60G 17/018 |
| 2018/0154723 | A1 | 6/2018 | Anderson et al. | |
| 2018/0326809 | A1* | 11/2018 | Masamura | ........... B60G 17/015 |
| 2022/0105772 | A1* | 4/2022 | Kim | .................... B60G 17/0165 |
| 2022/0105774 | A1* | 4/2022 | Furuta | ................... B60G 21/055 |
| 2022/0111695 | A1* | 4/2022 | Furuta | .................... B60G 17/06 |

\* cited by examiner

*Primary Examiner* — Phutthiwat Wongwian
*Assistant Examiner* — Anthony L Bacon
(74) *Attorney, Agent, or Firm* — Sughrue Mion, PLLC

(57) ABSTRACT

A vibration damping control apparatus of a vehicle obtains first data from a road surface information in which position information, a road surface displacement related value, and speed information are rerated to one another. The first data represents a time series change of the road surface displacement related value on a predicted route of a wheel. The vibration damping control apparatus obtains speed information at a predicted passage position from the road surface information. In the case where the speed of the vehicle at the present point in time is higher than a speed represented by the speed information, the vibration damping control apparatus executes a first process (low-pass filter process) on the first data, obtains preview information from the first data having been subjected to the first process, and controls a control force generating apparatus on the basis of a target control force computed by using the preview information.

12 Claims, 11 Drawing Sheets

| POSITION INFORMATION (X, Y) | UNSPRUNG DISPLACEMENT $z_1$ | AVERAGE SPEED |
|---|---|---|
| (X1,Y1) | $z_1\_a$ | $Vs\_a$ |
| (X2,Y2) | $z_1\_b$ | $Vs\_b$ |
| (X3,Y3) | $z_1\_c$ | $Vs\_c$ |
| ... | ... | ... |

| POSITION INFORMATION (X, Y) | SPEED RANGE | UNSPRUNG DISPLACEMENT $z_1$ | AVERAGE SPEED |
|---|---|---|---|
| (X1,Y1) | Vb1 | $z_1\_i$ | Vs_a |
| | Vb2 | $z_1\_j$ | Vs_b |
| | Vb3 | $z_1\_k$ | Vs_c |
| | Vb4 | $z_1\_l$ | Vs_d |
| (X2,Y2) | Vb1 | $z_1\_m$ | Vs_e |
| | Vb2 | $z_1\_n$ | Vs_f |
| | Vb3 | $z_1\_o$ | Vs_g |
| | Vb4 | $z_1\_p$ | Vs_h |
| ... | ... | ... | ... |

FIG.12

VIBRATION DAMPING CONTROL APPARATUS

BACKGROUND OF THE INVENTION

Field of the Invention

The present disclosure relates to a vibration damping control apparatus for a vehicle.

Description of the Related Art

Conventionally, there has been proposed an apparatus which controls actuators provided for wheels of a vehicle by using a piece of information relating to the vertical displacement of a road surface that the wheels of the vehicle are predicted to pass (road surface displacement), thereby performing control for suppressing vibrations of a sprung portion of the vehicle (see, for example, US Patent Application Publication No. 2018/154723). Such control is also called "preview vibration damping control."

Incidentally, the present inventor has studied an apparatus which collects values that relate to road surface displacements and were obtained when a measurement vehicle actually traveled on a road surface (hereinafter referred to as a "road surface displacement related value") and executes the preview vibration damping control by using the collected road surface displacement related value (hereinafter, such an apparatus will be referred to as a "vibration damping control apparatus").

However, the vibration damping control apparatus has the following problems. The frequency band (hereinafter referred to as the "first frequency band") of vibrations generated in the measurement vehicle when the measurement vehicle traveled on a certain road at a speed Vsa differs from the frequency band (hereinafter referred to as the "second frequency band") of vibrations generated in the measurement vehicle when the measurement vehicle traveled on the same road at a speed Vsb. Namely, the frequency band of vibrations represented by a time series change of the road surface displacement related value obtained when the measurement vehicle traveled at the speed Vsa is the first frequency band, and the frequency band of vibrations represented by a time series change of the road surface displacement related value obtained when the measurement vehicle traveled at the speed Vsb is the second frequency band. Here, it is assumed that the speed Vsb is higher than the speed Vsa, and the difference between the speed Vsb and the speed Vsa is relatively large. It is assumed that the first frequency band ranges from a frequency fa_low to a frequency fa_high (>fa_low), and the second frequency band ranges from a frequency fb_low to a frequency fb_high (>fb_low). In general, the frequency fb_high is lower than the frequency fa_high, and the frequency fb_low is lower than the frequency fa_low. Accordingly, the first frequency band contains a frequency band which is not contained in the second frequency band (for example, a frequency band from the frequency fb_high to the frequency fa_high). Furthermore, the larger the difference between the speed Vsb and the speed Vsa, the larger the difference between the frequency fb_high and the frequency fa_high.

In other words, the frequency band of vibrations that are highly likely to be suppressed properly by the preview vibration damping control when the vehicle is traveling at the speed Vsa is the first frequency band. The frequency band of vibrations that are highly likely to be suppressed properly by the preview vibration damping control when the vehicle is traveling at the speed Vsb is the second frequency band.

Accordingly, in the case where the speed of the measurement vehicle when the road surface displacement related value was obtained differs from the speed of a vehicle when the preview vibration damping control is executed in the vehicle, the following problem occurs. For example, it is assumed that, in a state in which the vehicle is traveling at the speed Vsb, the vibration damping control apparatus executes the preview vibration damping control by using the road surface displacement related value obtained when the measurement vehicle traveled at the speed Vsa. In this case, the frequency band of vibrations that are highly likely to be suppressed properly by the preview vibration damping control is the second frequency band (the frequency band from the frequency fb_low to the frequency fb_high). Meanwhile, the frequency band of vibrations represented by the road surface displacement related value is the first frequency band. The vibration damping control apparatus uselessly drives the actuators so as to suppress vibrations in the frequency band which is not contained in the second frequency band (the frequency band from the frequency fb_high to the frequency fa_high). Accordingly, excess energy is consumed by the actuators.

SUMMARY OF THE INVENTION

The present disclosure provides a technique which enables execution of preview vibration damping control while executing a proper process on road surface displacement related values in accordance with the speed of the vehicle.

The present disclosure provides a vibration damping control apparatus for a vehicle (10). The vibration damping control apparatus comprises a speed obtainment section (32, 33), a control force generating apparatus (17), and a control unit (30).

The speed obtainment section is configured to obtain information regarding speed (Vs) of the vehicle.

The control force generating apparatus is configured to generate control force in a vertical direction for damping vibration of a sprung portion of the vehicle, the control force being applied between at least one wheel and a portion of a body of the vehicle, which portion corresponds to a position of the wheel.

The control unit is configured to compute a predicted route that the wheel is predicted to pass, to obtain first data from road surface information (43) which is data in which relationships are established among position information representing a position on a road surface, a road surface displacement related value obtained when a measurement vehicle traveled and passed the position on the road surface, and speed information representing a speed of the measurement vehicle at the time when the measurement vehicle traveled and passed the position on the road surface, the first data representing a time series change of the road surface displacement related value on the predicted route, to obtain, from the first data, as preview information, the road surface displacement related value at a predicted passage position that the wheel is predicted to pass after elapse of an advance read time from a present point in time, to compute a target control force (Fct) which is a target value of the control force by using the preview information, and to execute preview vibration damping control for controlling the control force generating apparatus on the basis of the target control force.

The control unit is further configured to obtain the speed information ($43c$) at the predicted passage position from the road surface information, to execute a first process on the first data in the case where the speed of the vehicle at the present point in time is higher than a speed represented by the speed information, the first process being a low-pass filter process for reducing or removing components within a frequency band higher than a first cutoff frequency (fc1), and to obtain the preview information from the first data having been subjected to the first process.

By virtue of the above-described configuration, in the case where the speed of the vehicle at the present point in time is higher than the speed represented by the speed information obtained from the road surface information, the control unit executes the first process on the first data. As a result, the control unit can reduce or eliminate components in a high frequency band in the first data. The control unit obtains the preview information from the first data having been subjected to the first process. By virtue of this configuration, the control force generating apparatus is not uselessly driven. Therefore, it is possible to reduce the possibility that excess energy is consumed by the control force generating apparatus.

The control unit may be configured to change the advance read time by an amount determined in consideration of a phase shift occurring as a result of the first process and obtain the preview information from the first data having been subjected to the first process by using the changed advance read time.

A phase shift (phase delay) occurs in the first data as a result of the low-pass filter process. By virtue of the above-described configuration, the control unit can obtain accurate preview information from the first data in consideration of the phase delay.

The control unit may be configured to execute the first process on the first data in the case where a first condition is satisfied and the speed of the vehicle at the present point in time is higher than the speed represented by the speed information. The first condition is a condition that the absolute value (Vdf) of the difference between the speed of the vehicle at the present point in time and the speed represented by the speed information is equal to or greater than a first threshold (Th1).

The control unit may be configured to execute a process for changing the first cutoff frequency in such a manner that the larger the difference (dv1) between the absolute value and the first threshold, the lower the first cutoff frequency in the first process.

The greater the above-described difference, the greater the width of a frequency band of vibrations that cannot be suppressed by the preview vibration damping control (for example, the frequency band ranging from the frequency fb_high to the frequency fa_high). By virtue of this configuration, components in a wider high frequency band can be reduced or removed through the first process in the first data. It is possible to further reduce the possibility that excess energy is consumed by the control force generating apparatus.

The control unit may be configured such that, in the case where a second condition that the absolute value (Vdf) is equal to or greater than a second threshold (Th2) which is greater than the first threshold is satisfied, the control unit executes a process for making the target control force smaller as compared with the case where the second condition is not satisfied.

By virtue of this configuration, the target control force becomes smaller when the second condition is satisfied. Therefore, it is possible to reduce the possibility that excess energy is consumed by the control force generating apparatus.

The control unit may be configured to execute a second process on the first data in the case where the speed of the vehicle at the present point in time is lower than the speed represented by the speed information, the second process being a high-pass filter process for reducing or removing components within a frequency band lower than a second cutoff frequency (fc2), and to obtain the preview information from the first data having been subjected to the second process.

By virtue of the above-described configuration, in the case where the speed of the vehicle at the present point in time is lower than the speed represented by the speed information obtained from the road surface information, the control unit executes the second process on the first data. As a result, components in a low frequency band can be reduced or removed in the first data. The control unit obtains the preview information from the first data having been subjected to the second process. By virtue of this configuration, the control force generating apparatus is not uselessly driven. Therefore, it is possible to reduce the possibility that excess energy is consumed by the control force generating apparatus.

The control unit may be configured to change the advance read time by an amount determined in consideration of a phase shift occurring as a result of the second process and obtain the preview information from the first data having been subjected to the second process by using the changed advance read time.

A phase shift (phase advance) occurs in the first data as a result of the high-pass filter process. By virtue of the above-described configuration, the control unit can obtain accurate preview information from the first data in consideration of the phase advance.

The control unit may be configured to execute the second process on the first data in the case where the first condition is satisfied and the speed of the vehicle at the present point in time is lower than the speed represented by the speed information, the first condition being a condition that an absolute value (Vdf) of a difference between the speed of the vehicle at the present point in time and the speed represented by the speed information is equal to or greater than the first threshold (Th1).

The control unit may be configured to execute a process for changing the second cutoff frequency in such a manner that the larger the difference between the absolute value and the first threshold, the higher the second cutoff frequency in the second process.

The greater the above-described difference, the greater the width of a frequency band of vibrations that cannot be suppressed by the preview vibration damping control (for example, the frequency band ranging from the frequency fb_low to the frequency fa_low). By virtue of this configuration, components in a wider low frequency band can be reduced or removed through the second process in the first data. It is possible to further reduce the possibility that excess energy is consumed by the control force generating apparatus.

The control unit may be configured such that, in the case where a second condition that the absolute value (Vdf) is equal to or greater than a second threshold (Th2) which is greater than the first threshold is satisfied, the control unit executes a process for making the target control force smaller as compared with the case where the second condition is not satisfied.

By virtue of this configuration, the target control force becomes smaller when the second condition is satisfied. Therefore, it is possible to reduce the possibility that excess energy is consumed by the control force generating apparatus.

In the road surface information, the road surface displacement related value (44c) and the speed information (44d) may be set for each of a plurality of speed ranges (44b).

By virtue of this configuration, the control unit can obtain the road surface displacement related value and the speed information appropriate for the speed of the vehicle from the road surface information. Accordingly, it is possible to further reduce the possibility that excess energy is consumed by the control force generating apparatus, and it is possible to reduce the possibility that the vibration of the sprung portion increases.

The road surface displacement related value may include at least one of road surface displacement ($z_0$) representing displacement of the road surface in the vertical direction, road surface displacement speed ($dz_0$) representing a derivative value of the road surface displacement with respect to time, unsprung displacement ($z_1$) representing displacement of an unsprung portion of the vehicle in the vertical direction, and unsprung speed ($dz_1$) representing a derivative value of the unsprung displacement with respect to time.

The control unit may be realized by a microprocessor programed in order to execute one or more functions described in the present specification. The control unit may be entirely or partially realized by hardware composed of, for example, ASIC; i.e., an integrated circuit dedicated to one or more applications.

In the above description, constituent elements corresponding to those of embodiments which will be described later are accompanied by parenthesized names and/or symbols which are used in the embodiments; however, the constituent elements are not limited to those in the embodiments defined by the names and/or the symbols. Other objects, other features, and attendant advantages of the present disclosure will be readily appreciated from the following description of the embodiments which is made with reference to the accompanying drawings.

BRIEF DESCRIPTION OF THE DRAWINGS

FIG. 12 shows a modification of the road surface information map.

DESCRIPTION OF THE PREFERRED EMBODIMENTS (Configuration of Vibration Damping Control Apparatus)

Figure 1:
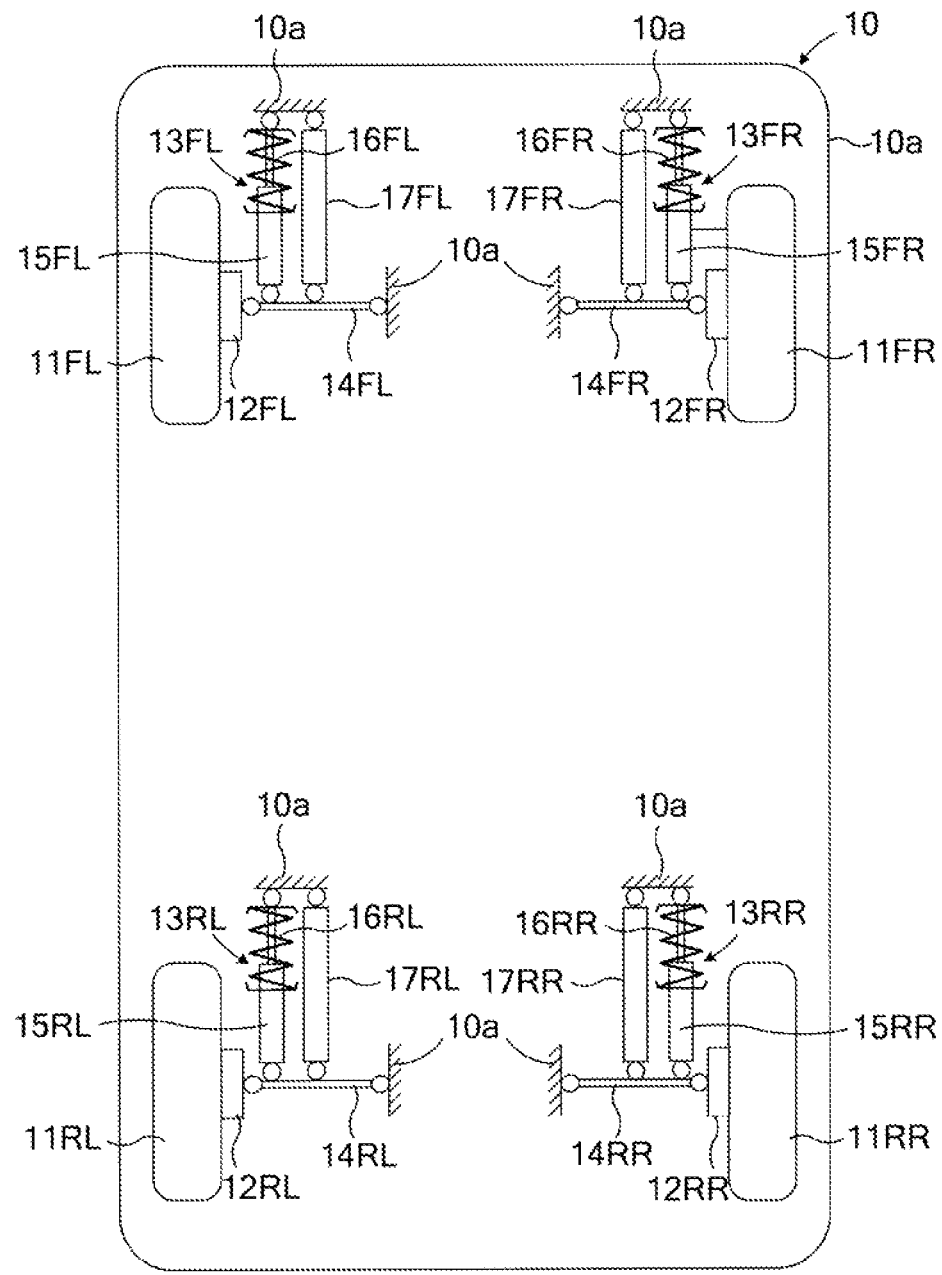
FIG. 1 is a schematic diagram of a vehicle to which a vibration damping control apparatus according to an embodiment is applied.
Figure 2:
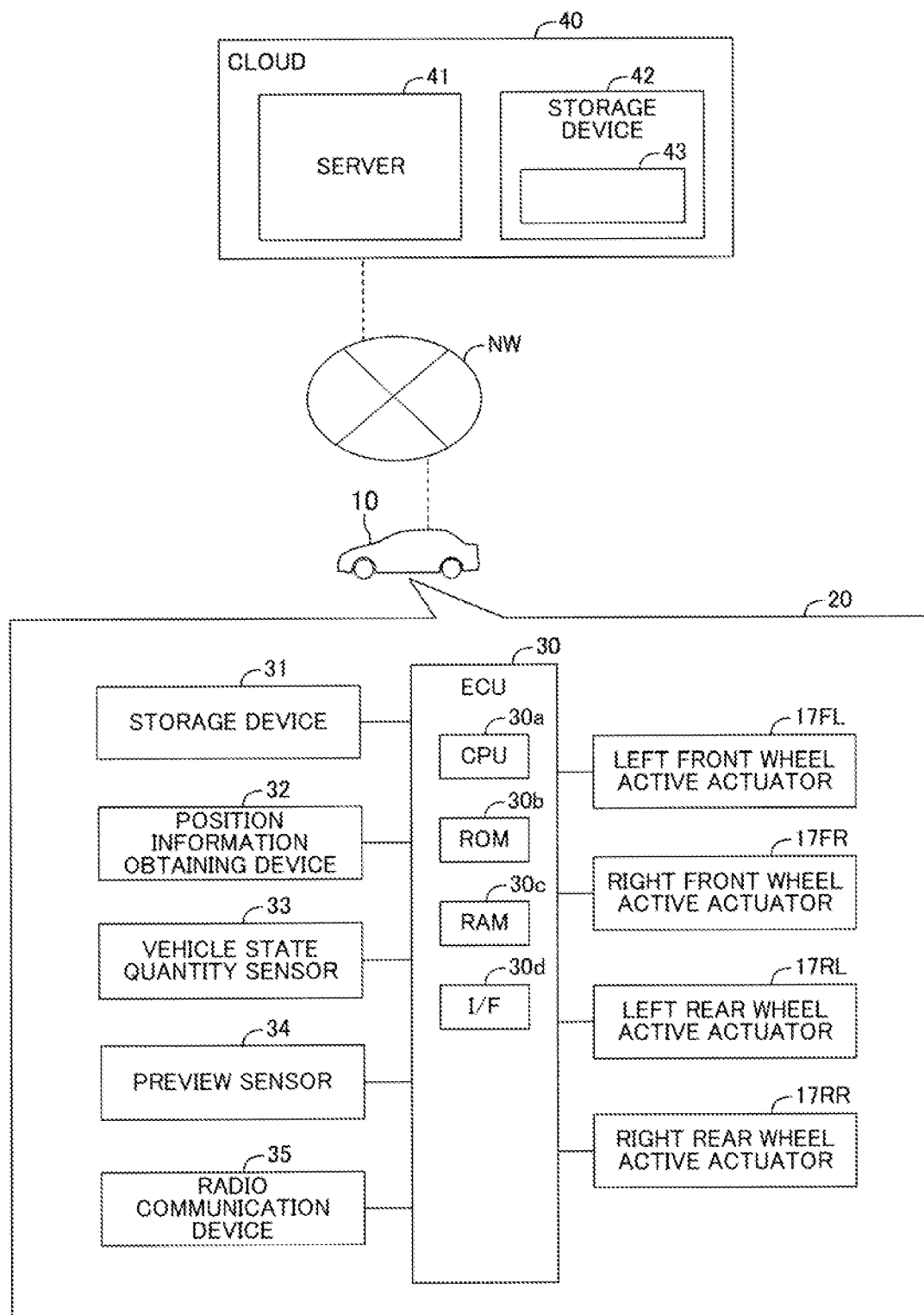
FIG. 2 is a schematic diagram of the vibration damping control apparatus according to the embodiment.

A vibration damping control apparatus according to an embodiment is applied to a vehicle 10 shown in FIG. 1. As shown in FIG. 2, hereinafter, this vibration damping control apparatus is referred to also as the "vibration damping control apparatus 20."

As shown in FIG. 1, the vehicle 10 includes a left front wheel 11FL, a right front wheel 11FR, a left rear wheel 11RL, and a right rear wheel 11RR. Notably, the left front wheel 11FL, the right front wheel 11FR, the left rear wheel 11RL, and the right rear wheel 11RR will be referred to as the "wheel(s) 11" in the case where these wheels are not required to be distinguished from one another. Similarly, the left front wheel 11FL and the right front wheel 11FR will be referred to as the "front wheel(s) 11F." Similarly, the left rear wheel 11RL and the right rear wheel 11RR will be referred to as the "rear wheel(s) 11R." Notably, in reference numerals for denoting various components, a suffix "FL" corresponds to the left front wheel 11FL, a suffix "FR" corresponds to the right front wheel 11FR, a suffix "RI" corresponds to the left rear wheel 11RL, and a suffix "RR" corresponds to the right rear wheel 11RR.

The left front wheel 11FL is rotatably supported by a body 10a via a wheel support member 12FL. The right front wheel 11FR is rotatably supported by the body 10a via a wheel support member 12FR. The left rear wheel 11RL is rotatably supported by the body 10a via a wheel support member 12RL. The right rear wheel 11RR is rotatably supported by the body 10a via a wheel support member 12RR. Notably, the wheel support members 12FL to 12RR will be referred to as the "wheel support member(s) 12" in the case where these wheel support members are not required to be distinguished from one another.

The vehicle 10 further includes a left front wheel suspension 13FL, a right front wheel suspension 13FR, a left rear wheel suspension 13RL, and a right rear wheel suspension 13RR. These suspensions 13FL to 13RR will now be described in detail. These suspensions 13FL to 13RR are independent-type suspensions. However, the suspensions 13FL to 13RR may be suspensions of a different type.

The left front wheel suspension 13FL suspends the left front wheel 11FL from the body 10a and includes a suspension arm 14FL, a shock absorber 15FL, and a suspension spring 16FL. The right front wheel suspension 13FR suspends the right front wheel 11FR from the body 10a and includes a suspension arm 14FR, a shock absorber 15FR, and a suspension spring 16FR.

The left rear wheel suspension 13RL suspends the left rear wheel 11RL from the body 10a and includes a suspension arm 14RL, a shock absorber 15RL, and a suspension spring 16RL. The right rear wheel suspension 13RR suspends the right rear wheel 11RR from the body 10a and includes a suspension arm 14RR, a shock absorber 15RR, and a suspension spring 16RR.

Notably, the left front wheel suspension 13FL, the right front wheel suspension 13FR, the left rear wheel suspension 13RL, and the right rear wheel suspension 13RR will be referred to as the "suspension(s) 13" in the case where these suspensions are not required to be distinguished from one another. Similarly, the suspension arms 14FL to 14RR will be referred to as the "suspension arm(s) 14." Similarly, the shock absorbers 15FL to 15RR will be referred to as the "shock absorber(s) 15." Similarly, the suspension springs 16FL to 16RR will be referred to as the "suspension spring(s) 16."

The suspension arm 14 connects the wheel support member 12 to the body 10a. In FIG. 1, a single suspension arm 14 is provided for each suspension 13. In a different example, a plurality of suspension arms 14 may be provided for each suspension 13.

The shock absorber 15 is disposed between the body 10a and the suspension arm 14. The upper end of the shock absorber 15 is connected to the body 10a, and the lower end of the shock absorber 15 is connected to the suspension arm 14. The suspension spring 16 is disposed between the body 10a and the suspension arm 14 via the shock absorber 15. Namely, the upper end of the suspension spring 16 is connected to the body 10a, and the lower end of the suspension spring 16 is connected to the cylinder of the shock absorber 15. Notably, in the case where the suspension spring 16 and the shock absorber 15 are disposed in series as described above, the upper end of the shock absorber 15 may be connected to the body 10a, and the lower end of the shock absorber 15 may be connected to the wheel support member 12.

In the present example, the shock absorber 15 is of a damping force fixed type. In a different example, the shock absorber 15 may be of a damping force adjustable type. Furthermore, the suspension spring 16 may be provided between the body 10a and the suspension arm 14 without intermediation of the shock absorber 15. Specifically, the upper end of the suspension spring 16 may be connected to the body 10a, and the lower end of the suspension spring 16 may be connected to the suspension arm 14. Notably, in the case where the suspension spring 16 and the shock absorber 15 are disposed in parallel as described above, the suspension spring 16 and the shock absorber 15 may be disposed in parallel between the body 10a and the wheel support member 12.

Figure 5:
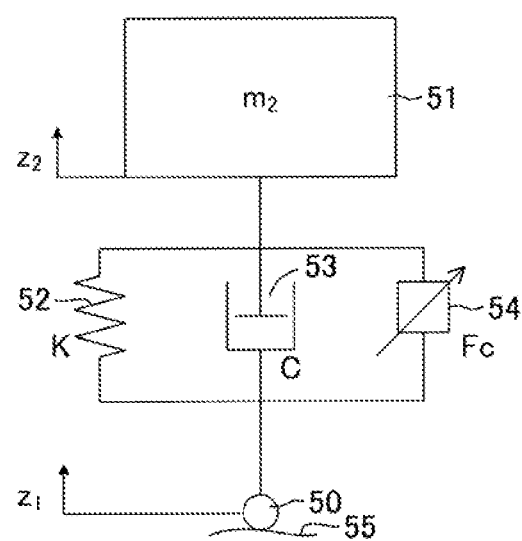
FIG. 5 is a view showing a single wheel model of the vehicle.

Of members including the wheel 11, the shock absorber 15, etc., portions located on the wheel 11 side of the suspension spring 16 will be collectively referred to as an "unsprung portion 50" or an "unsprung member 50" (see FIG. 5). On the other hand, of the members including the body 10a, the shock absorber 15, etc., portions located on the body 10a side of the suspension spring 16 will be collectively referred to as a "sprung portion 51" or a "sprung member 51" (see FIG. 5).

Furthermore, a left front wheel active actuator 17FL, a right front wheel active actuator 17FR, a left rear wheel active actuator 17RL, and a right rear wheel active actuator 17RR are provided between the body 10a and the suspension arms 14FL to 14RR, respectively. These active actuators 17FL to 17RR are disposed in parallel with the shock absorbers 15FL to 15RR and the suspension springs 16FL to 16RR, respectively.

Notably, the left front wheel active actuator 17FL, the right front wheel active actuator 17FR, the left rear wheel active actuator 17RL, and the right rear wheel active actuator 17RR will be referred to as the "active actuator(s) 17" in the case where these active actuators are not required to be distinguished from one another. Similarly, the left front wheel active actuator 17FL and the right front wheel active actuator 17FR will be referred to as the "front wheel active actuator(s) 17F." Similarly, the left rear wheel active actuator 17RL and the right rear wheel active actuator 17RR will be referred to as the "rear wheel active actuator(s) 17R."

The active actuator 17 generates a control force Fc on the basis of a control instruction from an electronic controller 30 shown in FIG. 2. The control force Fc is a force in the vertical direction which acts between the body 10a and the wheel 11 (namely, between the sprung portion 51 and the unsprung portion 50) so as to damp vibrations of the sprung portion 51. Notably, the electronic controller 30 will be referred to as the "ECU 30" and may be referred to as the "control unit" or the "controller." Furthermore, the active actuator 17 may be referred to as the "control force generating apparatus." The active actuator 17 is an electromagnetic active actuator. The active actuator 17 constitutes an active suspension in cooperation with the shock absorber 15, the suspension spring 16, etc.

As shown in FIG. 2, the vibration damping control apparatus 20 includes the above-mentioned ECU 30, a storage device 31, a position information obtaining device 32, a vehicle state quantity sensor 33, a preview sensor 34, and a radio communication device 35. Furthermore, the vibration damping control apparatus 20 includes the above-described active actuators 17FL to 17RR.

The ECU 30 includes a microcomputer. The microcomputer includes a CPU 30a, a ROM 30b, a RAM 30c, an interface (I/F) 30d, etc. The CPU 30a realizes various functions by executing instructions (programs, routines) stored in the ROM 30b.

The ECU 30 is connected to the storage device 31 into which information can be written and from which information can be read. In the present example, the storage device 31 is a hard disk drive. The ECU 30 can store information in the storage device 31 and can read out the information stored in the storage device 31. Notably, the storage device 31 is not limited to the hard disk drive and may be a well known storage device or storage medium into which information can be written and from which information can be read.

The ECU 30 is connected to the position information obtaining device 32, the vehicle state quantity sensor 33, the preview sensor 34, and the radio communication device 35.

The position information obtaining device 32 includes a GNSS (Global Navigation Satellite System) receiver and a map database. The GNSS receiver receives from satellites signals (for example, GNSS signals) for detecting the position of the vehicle 10. The map database stores map information. The position information obtaining device 32 determines the current position (for example, latitude and longitude) of the vehicle 10 on the basis of the GNSS signals and outputs a signal representing the determined position. The position information obtaining device 32 is, for example, a navigation device.

The GNSS signals contain information regarding the moving speed of the vehicle 10 and information regarding an azimuth angle which represents the heading direction of the vehicle 10. Accordingly, the position information obtaining device 32 outputs the speed Vs of the vehicle 10 at the present point in time and the azimuth angle θ representing the heading direction of the vehicle 10. As to the azimuth angle θ, the north in azimuth is defined to be 0°. The azimuth angle θ Increases clockwise. The east in azimuth is 90°, the south in azimuth is 180°, and the west in azimuth is 270°.

The vehicle state quantity sensor 33 includes a plurality of types of sensors for detecting the condition of the vehicle 10 (the speed, acceleration, direction, etc. of the vehicle 10). The vehicle state quantity sensor 33 includes a speed sensor for detecting the speed Vs of the vehicle 10, a plurality of wheel speed sensors for detecting the wheel speeds of the wheels 11, a longitudinal acceleration sensor for detecting the acceleration of the vehicle 10 in the longitudinal direction, a lateral acceleration sensor for detecting the acceleration of the vehicle 10 in the lateral direction, and a yaw rate sensor for detecting the yaw rate of the vehicle 10. Notably, the ECU 30 may compute the speed Vs of the vehicle 10 on the basis of signals from the plurality of wheel speed sensors.

The preview sensor 34 is, for example, one of a camera sensor, a LiDAR, and a radar sensor, or a combination thereof. The preview sensor 34 obtains a value representing the displacement of a road surface in the vertical direction ahead of the vehicle 10 (namely, road surface displacement $z_0$, which will be described later).

The radio communication device 35 is a radio communication terminal which communicates with a cloud (data management apparatus) 40 through a network NW for information transfer therebetween. The cloud 40 includes a server 41 and at least one storage device 42.

The server 41 includes a CPU, a ROM, a RAM, an interface (I/F), etc. The server 41 searches and reads out data stored in the storage device 42 and writes data into the storage device 42. Furthermore, in response to a request from the vibration damping control apparatus 20 (ECU 30), the server 41 provides the data stored in the storage device 42 (a road surface information map, which will be described later) to the vehicle 10 via the network NW.

The storage device 42 stores a road surface information map 43. The road surface information map 43 is data used when the vehicle 10 executes preview vibration damping control which will be described later. The road surface information map 43 is data obtained when a measurement vehicle actually traveled on a road surface as will be described later.

Figures 3, 4:
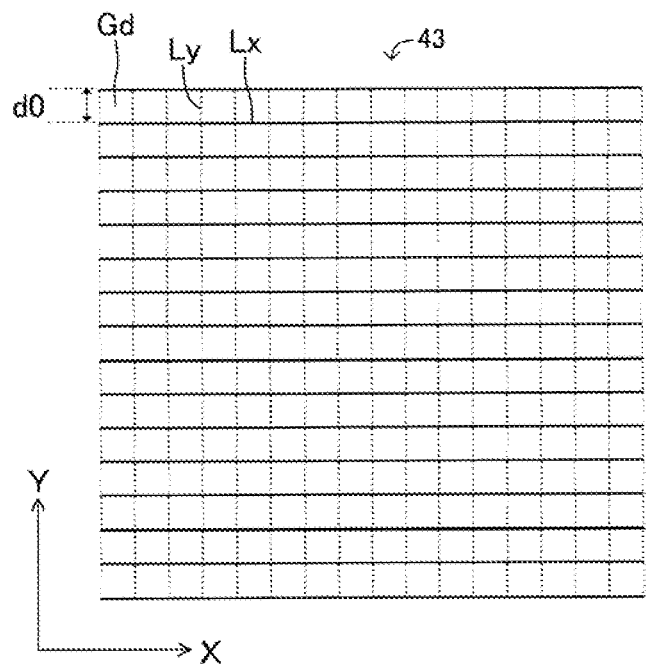
FIG. 3 is a chart used for describing a road surface information map according to the embodiment.
FIG. 4 shows one example of the road surface information map.

As shown in FIG. 3, in the road surface information map 43, a road is divided into a plurality of square sections Gd (referred to also as "meshes") having the same size by a plurality of parallel lines Lx extending in an X direction and a plurality of parallel lines Ly extending in a Y direction. The distance d0 of each side of each section Gd is 50 mm to 150 mm. In the present example, the distance d0 is 100 mm. Notably, the shape of each section Gd is not limited to square and may be determined in accordance with the size and shape of the contact area of a tire of the wheel 11.

In a present example, the X direction of the road surface information map 43 coincides with the north in azimuth, and the Y direction is perpendicular to the X direction. The positions of each section Gd in the X direction and the Y direction are represented by Xm (m=1, 2, 3, . . . ) and Yn (n=1, 2, 3, . . . ).

A road surface displacement related value, which is a value relating to displacement of a road surface in the vertical direction, is set in each section Gd of the road surface information map 43. The road surface displacement related value is a value obtained when the measurement vehicle actually traveled on the road surface. The road surface displacement related value contains at least one of road surface displacement $z_0$ representing the displacement of the road surface in the vertical direction, road surface displacement speed $dz_0$ representing the derivative value of the road surface displacement $z_0$ with respect to time, unsprung displacement $z_1$ representing the displacement of the unsprung portion 50 in the vertical direction, and unsprung speed $dz_1$ representing the derivative value of the unsprung displacement $z_1$ with respect to time. In the present example, the road surface displacement related value is the unsprung displacement $z_1$.

Furthermore, speed information is set in each section Gd of the road surface information map 43. In the present example, the speed information is the average of the speed of the measurement vehicle when passed the section Gd.

Accordingly, as shown in FIG. 4, the road surface information map 43 is data in which relationships are established among position information (X, Y) 43a representing a position on the road surface, an unsprung displacement (z1) 43b obtained when the measurement vehicle traveled and passed the position represented by the position information 43a, and average speed 43c which is the average of the speed of the measurement vehicle when passed the position represented by the position information 43a.

Referring back to FIG. 2, the ECU 30 is connected to the left front wheel active actuator 17FL, the right front wheel active actuator 17FR, the left rear wheel active actuator 17RL, and the right rear wheel active actuator 17RR via a drive circuit (not shown).

The ECU 30 computes a target control force Fct for each active actuator 17. The target control force Fct is control force for the preview vibration damping control; namely, control force for damping the vibration of the sprung portion 51 of the vehicle 10. The ECU 30 controls the active actuator 17 in such a manner that, at a point in time when the wheel 11 passes a predicted passage position which will be described later, the active actuator 17 generates a control force Fc corresponding to (equal to) the target control force Fct.

(Outline of Basic Preview Vibration Damping Control)

Now, the outline of basic preview vibration damping control executed by the vibration damping control apparatus 20 will be described. FIG. 5 shows a single wheel model of the vehicle 10 on a road surface 55.

A spring 52 corresponds to the suspension spring 16, a damper 53 corresponds to the shock absorber 15, and an actuator 54 corresponds to the active actuator 17.

In FIG. 4, the mass of the sprung portion 51 is labeled as sprung mass $m_2$. As described above, $z_1$ represents displacement of the unsprung portion 50 in the vertical direction (unsprung displacement). Displacement of the sprung portion 51 in the vertical direction will be referred to as sprung displacement $z_2$. The sprung displacement $z_2$ is the vertical displacement of the sprung portion 51 corresponding to the position of each wheel 11. The spring constant (equivalent spring constant) of the spring 52 is labeled as spring constant K. The damping coefficient (equivalent damping coefficient) of the damper 53 is labeled as damping coefficient C. The force generated by the actuator 54 is labeled as control force Fc.

Furthermore, the derivative values of $z_1$ and $z_2$ with respect to time are denoted by $dz_1$ and $dz_2$, respectively, and the second-order derivative values of $z_1$ and $z_2$ with respect to time are denoted by $ddz_1$ and $ddz_2$, respectively. In the following description, it is prescribed that $z_1$ and $z_2$ assume positive values for upward displacements, and, for forces generated by the spring 52, the damper 53, the actuator 54, etc., upward is positive.

In the single wheel model of the vehicle 10 shown in FIG. 5, the equation of motion for the motion of the sprung portion 51 in the vertical direction can be represented by expression (1).

$$m_2 ddz_2 = C(dz_1 - dz_2) + K(z_1 - z_2) - Fc \quad (1)$$

The damping coefficient C In expression (1) is assumed to be constant. However, since the actual damping coefficient changes with the stroke speed of the suspension 13, the damping coefficient C may be set to, for example, a value which changes with the derivative value of the stroke H with respect to time.

Furthermore, in the case where the vibration of the sprung portion 51 is completely cancelled out by the control force Fc (namely, in the case where all the sprung acceleration $ddz_2$, the sprung speed $dz_2$ and the sprung displacement $z_2$ become zero), the control force Fc is represented by expression (2).

$$Fc = Cdz_1 + Kz_1 \quad (2)$$

Accordingly, the control force Fc for reducing the vibration of the sprung portion 51 can be represented by expression (3), where α is a control gain. Notably, the control gain α is an arbitrary constant which is greater than 0 and not greater than 1.

$$Fc = \alpha(Cdz_1 + Kz_1) \quad (3)$$

When expression (3) is applied to expression (1), expression (1) can be represented by the following expression (4).

$$m_2 ddz_2 = C(dz_1 - dz_2) + K(z_1 - z_2) - \alpha(Cdz_1 + Kz_1) \quad (4)$$

When this expression (4) is subjected to Laplace transformation and is arranged, the following expression (5) is obtained. Namely, the transfer function from the unsprung displacement $z_1$ to the sprung displacement $z_2$ is represented by expression (5). Notably, "s" in expression (5) is a Laplacian operator.

$$\frac{z_2}{z_1} = \frac{(1-\alpha)(Cs+K)}{m_2 s^2 + Cs + K} \quad (5)$$

According to expression (5), the transfer function changes with the control gain α. Expression (5) shows that when the control gain α is an arbitrary value which is greater than 0 and not greater than 1, the magnitude of the transfer function certainly becomes smaller than "1" (namely, the vibration of the sprung portion 51 can be reduced). Furthermore, expression (5) shows that when the control gain α is 1, since the magnitude of the transfer function becomes "0," the vibration of the sprung portion 51 is completely cancelled out. On the basis of expression (3), the target control force Fct is computed in accordance with the following expression (6). Notably, the gain $\beta_1$ in expression (6) corresponds to αC, and the gain $\beta_2$ in expression (6) corresponds to αK.

$$Fct = \beta_1 \times dz_1 + \beta_2 \times z_1 \quad (6)$$

The ECU 30 previously obtains (reads ahead) the unsprung displacement $z_1$ at a position (predicted passage position) which the wheel 11 passes in the future, and applies the obtained unsprung displacement $z_1$ to expression (6), thereby computing the target control force Fct. The target control force Fct is a target value of the control force that the actuator 54 is caused to generate. Notably, since the term of the unsprung displacement $z_1$ and the term of the unsprung speed $dz_1$ on the right side of expression (6) are target control forces for damping the vibration of the sprung portion 51 generated when the wheel 11 passes the predicted passage position, they can be said to be "target control forces for feedforward control."

The ECU 30 causes the actuator 54 to generate a control force Fc corresponding to the target control force Fct at a timing when the wheel 11 passes the predicted passage position (namely, a timing when the unsprung displacement $z_1$ applied to expression (6) occurs). As a result, the vibration of the sprung portion 51 can be reduced when the wheel 11 passes the predicted passage position (namely, when the unsprung displacement $z_1$ applied to expression (6) occurs).

Notably, the ECU 30 may compute the target control force Fct in accordance with the following expression (7) which is obtained by omitting the differential term ($\beta_1 \times dz_1$) from expression (6). In this case as well, the ECU 30 can cause the actuator 54 to generate the control force Fc for reducing the vibration of the sprung portion 51. Accordingly, as compared with the case where the control force Fc is not generated, the vibration of the sprung portion 51 can be reduced.

$$Fct = \beta_2 \times z_1 \quad (7)$$

The control for damping the vibration of the sprung portion 51 as described above will be referred to as "preview vibration damping control."

Notably, in the above-described single wheel model, the mass of the unsprung portion 50 and elastic deformation of a tire are ignored, and it is assumed that the unsprung displacement $z_0$ and the road surface displacement $z_0$ representing the displacement of the road surface 55 in the vertical direction are the same. In different examples, similar preview vibration damping control may be executed by using the road surface displacement $z_0$ and/or the road surface displacement speed $dz_0$ in place of or in addition to the unsprung displacement $z_1$ and the unsprung speed $dz_1$.

(Outline of Preview Vibration Damping Control for Front Wheels and Rear Wheels)

Next, the outline of the preview vibration damping control will be described for the front wheels and the rear wheels, respectively, with reference to FIGS. 6 to 8. For the "target control force Fct" and the "control force Fc," a suffix "F" represents that the target control force Fct and the control force Fc are those for the front wheel 11F, and a suffix "R" represents that the target control force Fct and the control force Fc are those for the rear wheel 11R.

Figure 6:
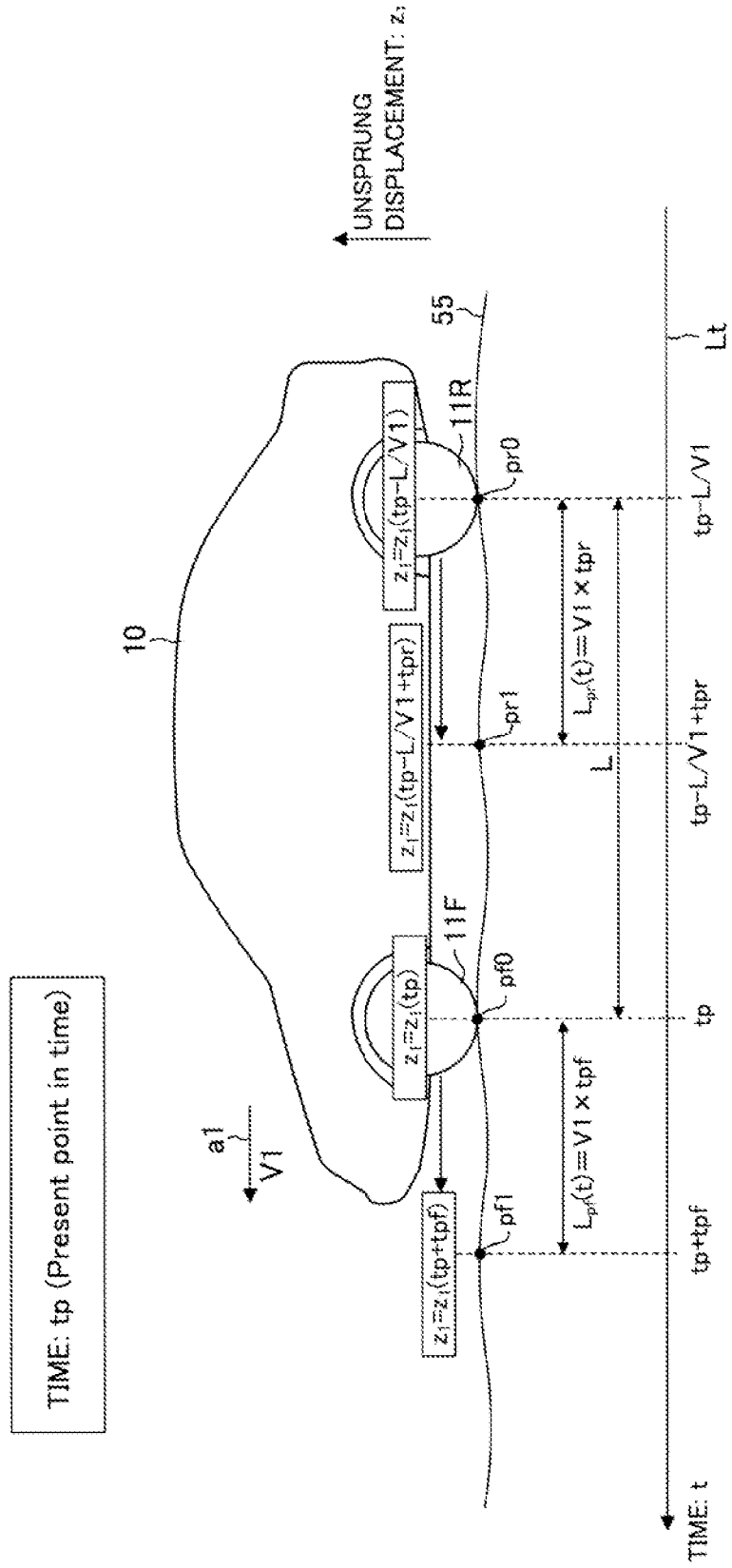
FIG. 6 is a chart used for describing preview vibration damping control.

FIG. 6 shows the vehicle 10 which is traveling at a speed V1 in a direction indicated by an arrow a1 at the present point in time tp. Notably, in the following description, the front wheel 11F and the rear wheel 11R are wheels on the left side or the right side, and the moving speeds of the front wheel 11F and the rear wheel 11R are considered to be the same as the speed V1.

In FIG. 6, a line Lt is a virtual time axis t. The unsprung displacement $z_1$ of the front wheel 11F on a moving route at time t at the present, in the past, and in the future is represented by a function $z_1(t)$ of time t. Therefore, the unsprung displacement $z_1$ of the front wheel 11F at a position (ground contact point) pf0 at the present point in time tp is represented as $z_1(tp)$. Furthermore, the unsprung displacement $z_1$ of the rear wheel 11R at a position pr0 at the present point in time tp is equal to the unsprung displacement $z_1$ of the front wheel 11F at a point in time "tp−L/V1" which is earlier than the present point in time tp by a time (L/V1) which the front wheel 11F took to move over a distance corresponding to a wheelbase L. Therefore, the unsprung displacement $z_1$ of the rear wheel 11R at the present point in time tp is represented as $z_1(tp-L/V1)$.

(Preview Vibration Damping Control for the Front Wheel 11F)

The ECU 30 computes a predicted route of the front wheel 11F. The predicted route of the front wheel 11F is a route that the front wheel 11F is predicted to pass. Next, the ECU 30 determines a predicted passage position pf1 of the front wheel 11F. The predicted passage position pf1 is a position that the front wheel 11F is predicted to pass after elapse of a front wheel advance read time tpf from the present point in time. The front wheel advance read time tpf is set in advance to a time which is necessary for the front wheel active actuator 17F to output the control force FcF corresponding to the target control force FctF after the ECU 30 has determined the predicted passage position pf1. The predicted passage position pf1 is apart from the position pf0 of the front wheel 11F at the present point in time tp by a front wheel advance read distance Lpf (=V1×tpf) along a predicted route of the front wheel 11F. As will be described later, the position pf0 is calculated on the basis of the present position of the vehicle 10 obtained by the position information obtaining device 32.

The ECU 30 previously obtains from the cloud 40 the road surface information map 43 for a region (preparation section, which will be described later) in the vicinity of the present position of the vehicle 10. The ECU 30 obtains an unsprung displacement $z_1$(tp+tpf) on the basis of the predicted passage position pf1 and the road surface information map 43 obtained beforehand. More specifically, the ECU 30 obtains from the road surface information map 43 the unsprung displacement ($z_1$) 43b at the predicted passage position pf1. Since the unsprung displacement ($z_1$) 43b at the predicted passage position pf1 is a piece of information obtained for executing the preview vibration damping control, the unsprung displacement ($z_1$) 43b will be referred to as the "preview information" in some cases.

The ECU 30 computes the target control force FctF (=βf×$z_1$(tp+tpf)) by applying the unsprung displacement $z_1$(tp+tpf) to the unsprung displacement $z_1$ of the following expression (8).

$$FctF = \beta f \times z_1 \quad (8)$$

The ECU 30 transmits a control instruction containing the target control force FctF to the front wheel active actuator 17F such that the front wheel active actuator 17F generates a control force FcF corresponding to (equal to) the target control force FctF.

Figure 7:
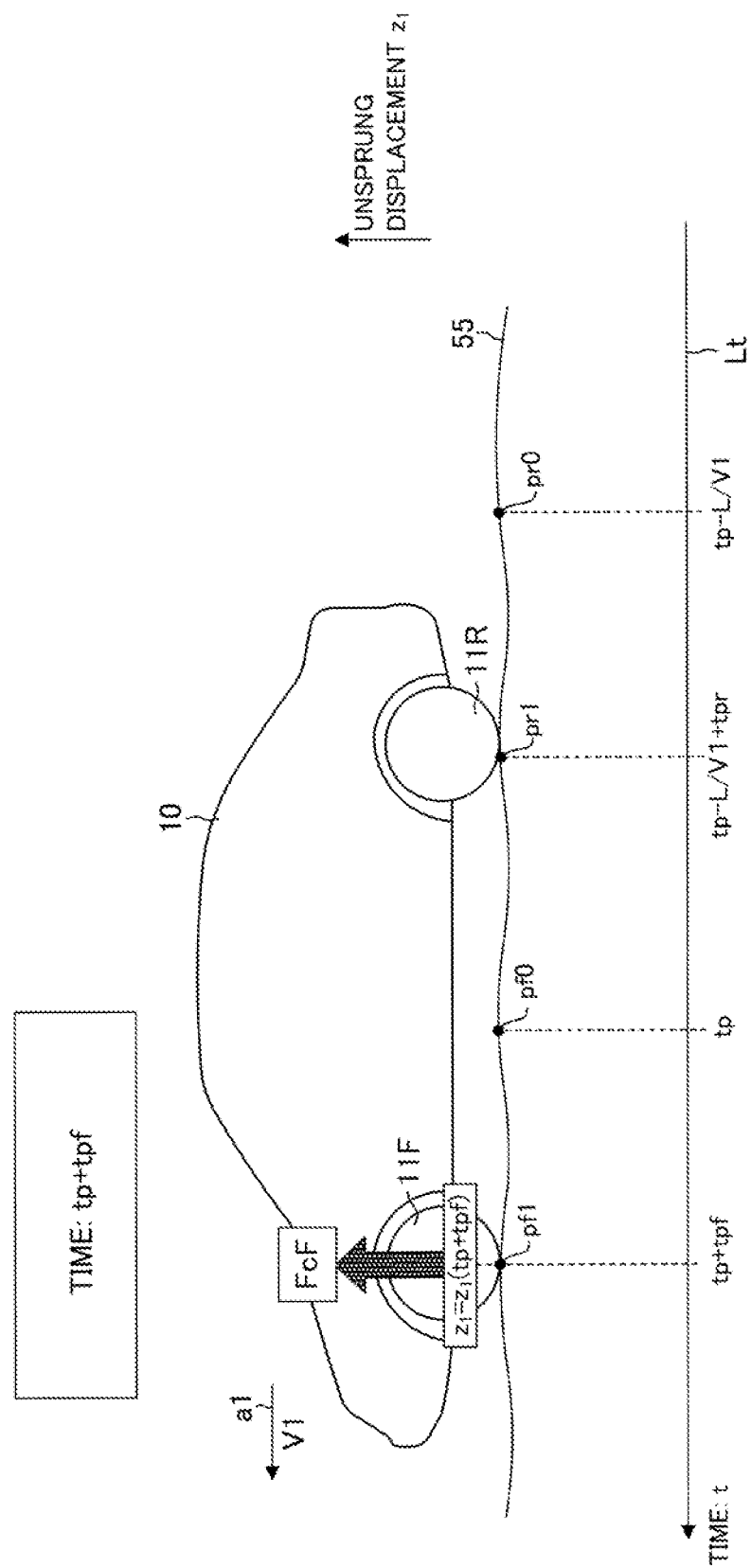
FIG. 7 is another chart used for describing the preview vibration damping control.

As shown in FIG. 7, the front wheel active actuator 17F generates the control force FcF corresponding to the target control force FctF at a point in time tp+tpf which is later than the present point in time tp by the front wheel advance read time tpF (namely, a timing when the front wheel 11F actually passes the predicted passage position pf1). Therefore, the front wheel active actuator 17F can generate at a proper timing the control force FcF which suppresses the vibration of the sprung portion 51 stemming from the unsprung displacement $z_1$ of the front wheel 11F at the predicted passage position pf1.

(Preview Vibration Damping Control for the Rear Wheel 11R)

The ECU 30 computes a predicted route of the rear wheel 11R. The predicted route of the rear wheel 11R is a route that the rear wheel 11R is predicted to pass. The ECU 30 computes the predicted route of the rear wheel 11R under the assumption that the rear wheel 11R follows the same route as the front wheel 11F. The ECU 30 may compute the predicted route of the rear wheel 11R by using the record of the position of the front wheel 11F.

As shown in FIG. 6, the ECU 30 determines a predicted passage position pr1 of the rear wheel 11R. The predicted passage position pr1 is a position that the rear wheel 11R is predicted to pass after elapse of a rear wheel advance read time tpr from the present point in time. The rear wheel advance read time tpr is set in advance to a time which is necessary for the rear wheel active actuator 17R to output a control force FcR corresponding to the target control force FctR after the ECU 30 has determined the predicted passage position pr1.

Notably, in the case where the front wheel active actuator 17F and the rear wheel active actuator 17R differ in response, the front wheel advance read time tpf and the rear wheel advance read time tpr are set to different values in advance. In the case where the front wheel active actuator 17F and the rear wheel active actuator 17R are the same in response, the front wheel advance read time tpf and the rear wheel advance read time tpr are set to the same value beforehand.

The ECU 30 determines, as the predicted passage position pr1, a position that is apart from the position pr0 of the rear wheel 11R at the present point in time tp by a rear wheel advance read distance Lpr (=V1×tpr) along the predicted route of the rear wheel 11R. The position pr0 is calculated on the basis of the present position of the vehicle 10 obtained by the position information obtaining device 32. Since the unsprung displacement $z_1$ at this predicted passage position pr1 is equal to the unsprung displacement $z_1$ at a point of time which is later, by the rear wheel advance read time tpr, than the "point in time (tp−L/V1) when the front wheel 11F was located at the position pr0 of the rear wheel 11R at the present point in time," the unsprung displacement $z_2$ at the predicted passage position pr1 can be represented as $z_1$(tp−L/V1+tpr). The ECU 30 obtains the unsprung displacement $z_1$(tp/V1+tpr) on the basis of the predicted passage position pr1 and the road surface information map 43 obtained beforehand. More specifically, the ECU 30 obtains, from the road surface information map 43, the unsprung displacement (z) 43b at the predicted passage position pr1.

Furthermore, the ECU 30 computes the target control force FctR (=βr×$z_1$(tp−L/V1+tpr)) by applying the unsprung displacement $z_1$(tp−L/V1+tpr) to the unsprung displacement $z_1$ of the following expression (9). Notably, the gain βf in expression (8) and the gain βr in expression (9) are set to values different from each other. This is because the spring constant Kf of the left front wheel suspension 13FL and the right front wheel suspension 13FR differs from the spring constant Kr of the left rear wheel suspension 13RL and the right rear wheel suspension 13RR.

$$FctR = \beta r \times z_1 \quad (9)$$

The ECU 30 transmits a control instruction containing the target control force FctR to the rear wheel active actuator 17R such that the rear wheel active actuator 17R generates a control force FcR corresponding to (equal to) the target control force FctR.

Figure 8:
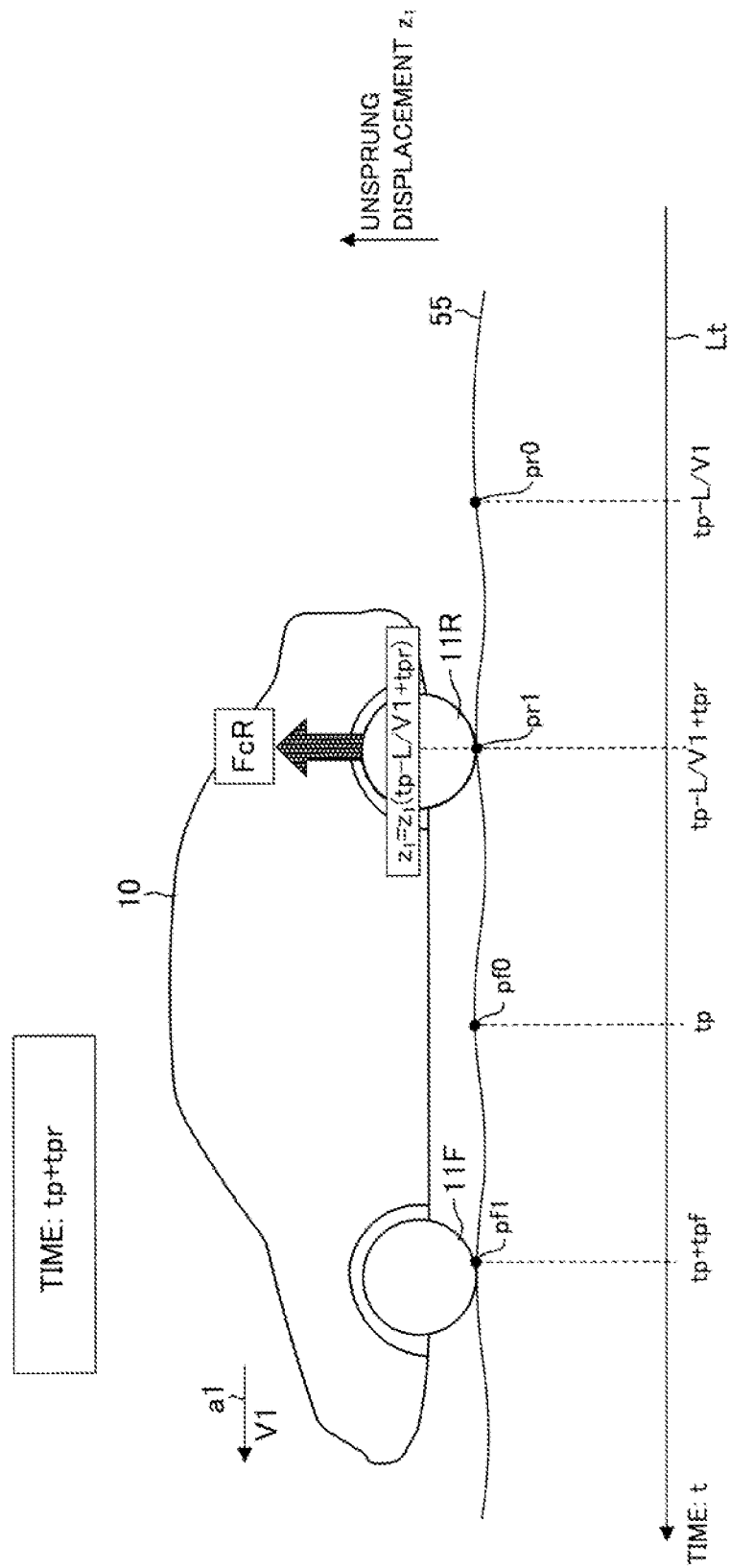
FIG. 8 is still another chart used for describing the preview vibration damping control.

As shown in FIG. 8, the rear wheel active actuator 17R generates the control force FcR corresponding to the target control force FctR at a point in time tp+tpr which is later than the present point in time tp by the rear wheel advance read time tpr (namely, a timing when the rear wheel 11R actually passes the predicted passage position pr1). Therefore, the rear wheel active actuator 17R can generate at a proper timing the control force FcR which suppresses the vibration of the sprung portion 51 stemming from the unsprung displacement $z_1$ of the rear wheel 11R at the predicted passage position pr1.

(Outline of Operation)

In the following description, a wheel 11 subjected to the preview vibration damping control will be referred to as the "wheel 11$i$." The suffix "$i$" represents any one of FL, FR, RL, and RR. Furthermore, the suffix "$i$" added to the reference numerals of other elements has the same meaning.

The speed Vs of the vehicle 10 when the preview vibration damping control is executed may differ from the speed of the measurement vehicle when the unsprung displacement ($z_1$) 43$b$ in the road surface information map 43 was obtained. In this case, as described above, excess energy is consumed by the active actuator 17$i$. Furthermore, if the active actuator 17$i$ is driven despite that vibrations in a high frequency band (for example, a frequency band of fb_high to fa_high) cannot be suppressed, the vibration of the sprung portion 51 may increase.

In view of the above, the ECU 30 operates as follows. The ECU 30 first computes the predicted route of the wheel 11$i$. In the case where the wheel 11$i$ is the front wheel 11F, the predicted route of the wheel 11$i$ is a line which extends forward from the present position of the wheel 11$i$; specifically, a line which extends from the present position of the wheel 11$i$ to a position which is shifted forward in the heading direction of the vehicle 10 (in the present example, the direction of the azimuth angle θ) by a predetermined distance Dt. For example, the distance Dt may be equal to or shorter than a wheelbase L. Notably, in the case where the wheel 11$i$ is the rear wheel 11R, the ECU 30 may employ the record of the position of the front wheel 11F as a predicted route.

The ECU 30 previously obtains the road surface information map 43 for a preparation section from the cloud 40 and stores the road surface information map 43 in the RAM 30$c$. The preparation section is a section of a road which is located ahead of the vehicle 10 and which the vehicle 10 is predicted to pass later on. The preparation section is a section which is sufficiently large so that the predicted route of the wheel 11$i$ is contained in the preparation section.

The ECU 30 obtains, from the road surface information map 43, values of the unsprung displacement ($z_1$) 43$b$ on the predicted route of the wheel 11$i$. The set of the values of the unsprung displacement ($z_1$) 43$b$ obtained in this manner represents a time series change of the unsprung displacement $z_1$ on the predicted route of the wheel 11$i$, and, hereinafter, will be referred to as the "first time series change data of the unsprung displacement $z_1$."

The ECU 30 obtains the speed Vs of the vehicle 10 at the present point in time from the position Information obtaining apparatus 32. Furthermore, the ECU 30 obtains the average speed 43$c$ at the predicted passage position of the wheel 11$i$ from the road surface information map 43. In the following description, the average speed 43$c$ at the predicted passage position of the wheel 11$i$ will be referred to as the "average speed Vs_av."

The ECU 30 computes the absolute value Vdf of the difference between the speed Vs and the average speed Vs_av (Vdf=|Vs−Vs_av|). Subsequently, the ECU 30 determines whether or not a first condition is satisfied. The first condition is satisfied when the value Vdf is equal to or greater than a predetermined first threshold Th1.

In the case where the first condition is not satisfied, this means that the difference between the speed Vs and the average speed Vs_av is small, and the above-described problem does not occur. Accordingly, the ECU 30 obtains the preview information (the unsprung displacement $z_1$ at the predicted passage position of the wheel 11$i$) from the first time series change data of the unsprung displacement $z_1$. Subsequently, the ECU 30 computes the target control force Fcti by using the obtained unsprung displacement $z_1$.

Meanwhile, in the case where the first condition is satisfied, this means that the difference between the speed Vs and the average speed Vs_av is large, and the above-described problem may occur. In view of this, the ECU 30 executes the following process. The ECU 30 determines whether the speed Vs is higher or lower than the average speed Vs_av.

In the case where the speed Vs is higher than the average speed Vs_av, as described above, the ECU 30 may uselessly drive the active actuator 17$i$ despite that vibrations in a high frequency band (for example, the frequency band of fb_high to fa_high) cannot be suppressed. Accordingly, the ECU 30 executes a first process on the first time series change data of the unsprung displacement $z_1$. The first process is a low-pass filter process for reducing or removing components in a frequency band higher than a first cutoff frequency fc1. For example, the first cutoff frequency fc1 is lower than the resonance frequency of the unsprung portion and higher than the resonance frequency of the sprung portion.

By virtue of the above-described configuration, the ECU 30 can reduce or remove the components in the high frequency band from the first time series change data of the unsprung displacement $z_1$. The ECU 30 obtains the preview information (the unsprung displacement $z_1$ at the predicted passage position of the wheel 11$i$) from the "first time series change data of the unsprung displacement $z_1$" having been subjected to the first process. The ECU 30 computes the target control force Fcti by using the obtained unsprung displacement $z_1$. Since the active actuator 17$i$ is not uselessly driven, it is possible to reduce the possibility that excess energy is consumed by the active actuator 17$i$. Furthermore, it is possible to reduce the possibility that the vibration of the sprung portion 51 increases.

Meanwhile, in the case where the speed Vs is lower than the average speed Vs_av, the ECU 30 may uselessly drive the active actuator 17$i$ despite that vibrations in a low frequency band (for example, the frequency band of fb_low to fa_low) cannot be suppressed. Accordingly, in the case where the speed Vs is lower than the average speed Vs_av, the ECU 30 executes a second process on the first time series change data of the unsprung displacement $z_1$. The second process is a high-pass filter process for reducing or removing components in a frequency band lower than a second cutoff frequency fc2. For example, the second cutoff frequency fc2 is lower than the resonance frequency of the sprung portion.

By virtue of the above-described configuration, the ECU 30 can reduce or remove the components in the low frequency band from the first time series change data of the unsprung displacement $z_1$. The ECU 30 obtains the preview information (the unsprung displacement $z_1$ at the predicted passage position of the wheel 11$i$) from the "first time series change data of the unsprung displacement $z_2$" having been subjected to the second process. The ECU 30 computes the target control force Fcti by using the obtained unsprung displacement $z_1$. Since the active actuator 17$i$ is not uselessly driven, it is possible to reduce the possibility that excess energy is consumed by the active actuator 17$i$. Furthermore, it is possible to reduce the possibility that the vibration of the sprung portion 51 increases.

(Vibration Damping Control Routine)

Every time a predetermined time elapses, the CPU of the ECU 30 (hereinafter referred to as the "CPU1") executes a vibration damping control routine shown in FIG. 9. The CPU1 executes the vibration damping control routine for each of the wheels 11. As in the above description, a wheel 11 for which the vibration damping control routine is executed will be referred to as the "wheel 11$i$."

Notably, by executing an unillustrated routine every time a predetermined time elapses, the CPU1 previously obtains the road surface information map 43 for the preparation section from the cloud 40 and temporarily stores the road surface information map 43 in the RAM 30$c$ (or the storage device 31).

Figure 9:
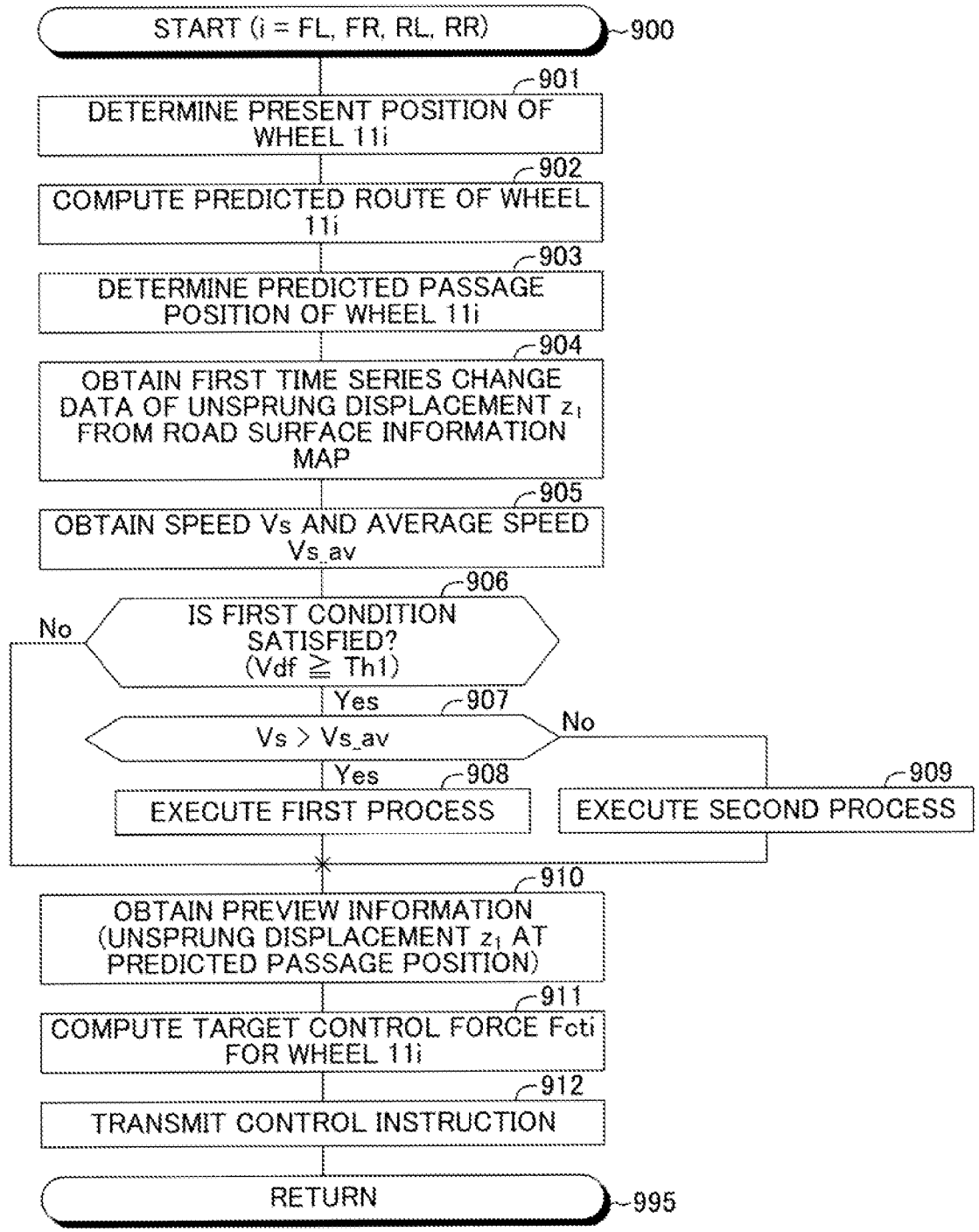
FIG. 9 is a flowchart representing a "vibration damping control routine" executed by a CPU of an electronic controller (30) according to the embodiment.

When a predetermined timing has come, the CPU1 starts the process from step 900 of FIG. 9, executes step 901 to step 905 in this order, and then proceeds to step 906.

Step 901: The CPU1 determines the present position of the wheel 11$i$. Specifically, the CPU1 obtains, from the position information obtaining device 32, the present position of the vehicle 10 and the azimuth angle θ representing the heading direction of the vehicle 10. Positional relationship data representing the relationship between the position of each wheel 11 and the mounting position of the GNSS receiver in the vehicle 10 are stored in the ROM 30$b$ of the ECU 30 beforehand. The present position of the vehicle 10 obtained from the position information obtaining device 32 corresponds to the mounting position of the GNSS receiver. Accordingly, the CPU1 determines the present position of the wheel 11$i$ on the basis of the present position of the vehicle 10, the azimuth angle θ of the vehicle 10, and the above-described positional relationship data.

Step 902: The CPU1 computes a predicted route of the wheel 11$i$ in a manner described above. In the case where the wheel 11$i$ is the front wheel 11F, the CPU1 computes, as the predicted route, a line which extends forward from the present position of the wheel 11$i$ by a distance Dt in the heading direction of the vehicle 10 (the direction of the azimuth angle θ). In the case where the wheel 11$i$ is the rear wheel 11R, the CPU1 computes a predicted route under the assumption that the rear wheel 11R follows the same route as the front wheel 11F.

Step 903: The CPU1 determines a predicted passage position of the wheel 11$i$. In the case where the wheel 11$i$ is the front wheel 11F, the CPU1 computes the front wheel advance read distance Lpf by multiplying the speed Vs by the front wheel advance read time tpf. Furthermore, the CPU1 determines, as the predicted passage position pf1, a position that is shifted forward from the present position of the front wheel 11F by the front wheel advance read distance Lpf along the predicted route. In the case where the wheel 11$i$ is the rear wheel 11R, the CPU1 computes the rear wheel advance read distance Lpr by multiplying the speed Vs by the rear wheel advance read time tpr. Furthermore, the CPU1 determines, as the predicted passage position pr1, a position that is shifted forward from the present position of the rear wheel 11R by the rear wheel advance read distance Lpr along the predicted route.

Step 904: The CPU1 obtains the first time series change data of the unsprung displacement $z_1$ (the set of values of the unsprung displacement $z_1$ on the predicted route of the wheel 11$i$) from the road surface information map 43 stored in the RAM 30$c$.

Step 905: The CPU1 obtains the speed Vs of the vehicle 10 at the present point in time from the position information obtaining apparatus 32. Furthermore, the CPU1 obtains the average speed 43$c$ (Vs_av) at the predicted passage position of the wheel 11$i$ from the first time series change data of the unsprung displacement $z_1$.

When the CPU1 proceeds to step 906, the CPU1 determines whether or not the above-described first condition is satisfied. The first condition is satisfied when the value Vdf (=|Vs−Vs_av|) is equal to or greater than the first threshold Th1.

In the case where the first condition is not satisfied, the CPU1 makes a "No" determination in step 906, executes steps 910 to 912 (which will be described below) in this order, and then proceeds to step 995 so as to end the current execution of the present routine.

Step 910: The CPU1 obtains the preview Information (the unsprung displacement $z_1$ at the predicted passage position of the wheel 11$i$) from the first time series change data of the unsprung displacement $z_1$.

Step 911: As described above, the CPU1 computes the target control force Fcti by using the unsprung displacement $z_1$ obtained in step 910. In the case where the wheel 11$i$ is the front wheel 11F, the CPU1 computes the target control force Fcti by applying the unsprung displacement $z_1$ obtained in step 910 to expression (8). In the case where the wheel 11$i$ is the rear wheel 11R, the CPU1 computes the target control force Fcti by applying the unsprung displacement $z_1$ obtained in step 910 to expression (9).

Step 912: The CPU1 transmits a control instruction containing the target control force Fcti to the active actuator 17$i$ corresponding to the wheel 11$i$.

Meanwhile, in the case where the first condition is satisfied, the CPU1 makes a "Yes" determination in step 906 and proceeds step 907 so as to determine whether or not the speed Vs is higher than the average speed Vs_av. In the case where the speed Vs is higher than the average speed Vs_av, the CPU1 makes a "Yes" determination in step 907 and proceeds to step 908 so as to execute the first process on the first time series change data of the unsprung displacement $z_1$. Subsequently, the CPU1 executes step 910 to step 912 in this order as described above, and then proceeds to step 995 so as to end the current execution of the present routine. Notably, in this case, in step 910, the CPU1 obtains the unsprung displacement $z_1$ at the predicted passage position of the wheel 11$i$ from "the first time series change data of the unsprung displacement $z_1$" having been subjected to the first process.

Meanwhile, in the case where the speed Vs is lower than the average speed Vs_av, the CPU1 makes a "No" determination in step 907 and proceeds to step 909 so as to execute the second process on the first time series change data of the unsprung displacement $z_1$. Subsequently, the CPU1 executes step 910 to step 912 in this order as described above, and then proceeds to step 995 so as to end the current execution of the present routine. Notably, in this case, in step 910, the CPU1 obtains the unsprung displacement $z_1$ at the predicted passage position of the wheel 11$i$ from "the first time series change data of the unsprung displacement $z_1$" having been subjected to the second process.

As can be understood from the above, in the case where the first condition is satisfied and the speed Vs is higher than the average speed Vs_av, the vibration damping control apparatus 20 executes the first process on the first time series change data of the unsprung displacement $z_1$. As a result, components in the high frequency band can be reduced or removed from the first time series change data of the unsprung displacement $z_1$. The vibration damping control apparatus 20 obtains the unsprung displacement $z_1$ at the predicted passage position of the wheel 11$i$ from "the first time series change data of the unsprung displacement $z_1$" having been subjected to the first process, and executes the preview vibration damping control by using the obtained unsprung displacement $z_1$.

In the case where the first condition is satisfied and the speed Vs is lower than the average speed Vs_av, the vibration damping control apparatus 20 executes the second process on the first time series change data of the unsprung displacement $z_1$. Components in the low frequency band can be reduced or removed from the first time series change data of the unsprung displacement $z_2$. The vibration damping control apparatus 20 obtains the unsprung displacement $z_1$ at the predicted passage position of the wheel 11*i* from "the first time series change data of the unsprung displacement $z_1$" having been subjected to the second process, and executes the preview vibration damping control by using the obtained unsprung displacement $z_1$. By virtue of the above-described configuration, since the active actuator 17*i* is not uselessly driven, it is possible to reduce the possibility that excess energy is consumed by the active actuator 17*i*. Furthermore, it is possible to reduce the possibility that the vibration of the sprung portion 51 increases. In addition, it is possible to prevent generation of heat in the active actuator 17*i* and wear of components of the active actuator 17*i*.

(Configuration of Data Management System)

Figure 10:
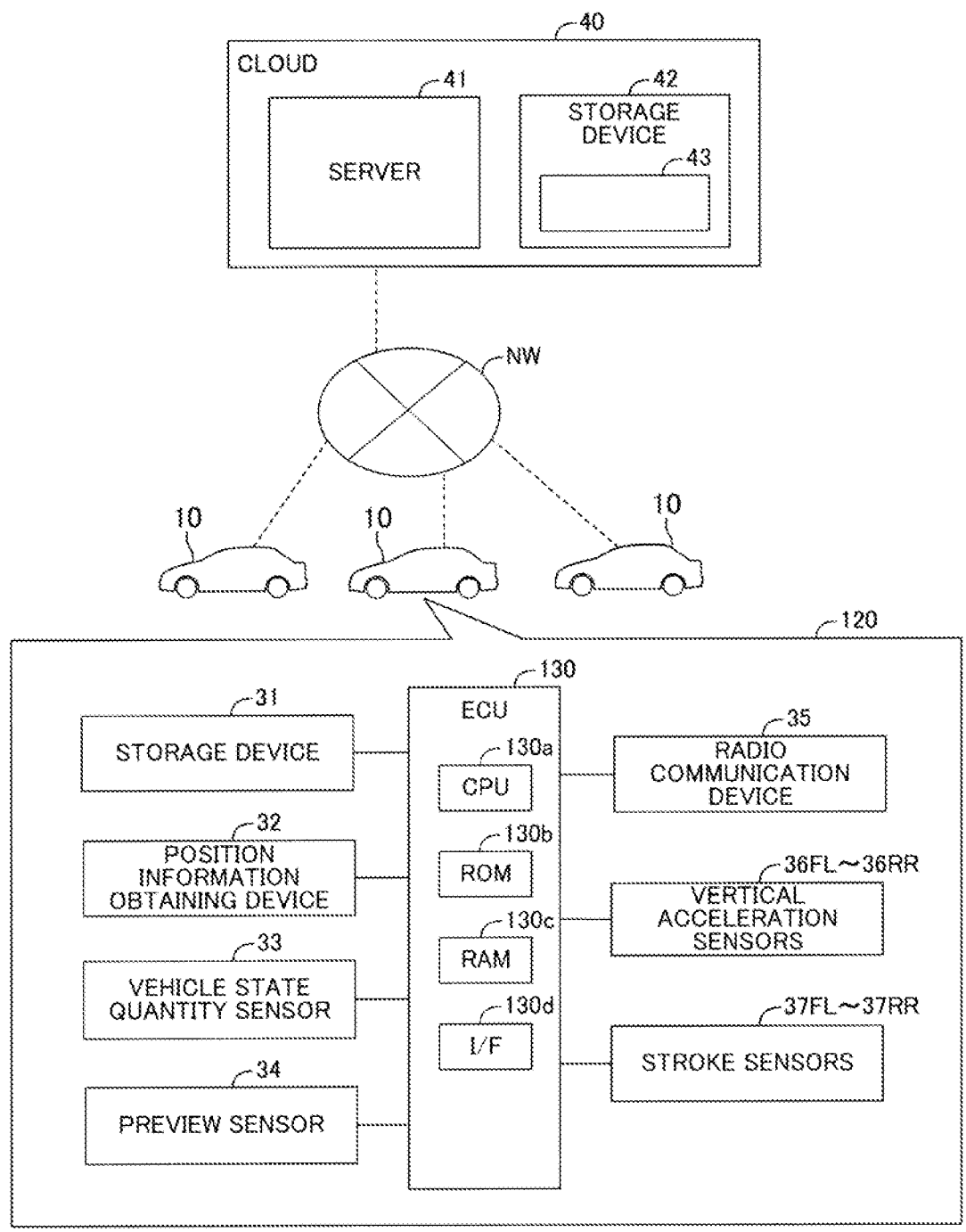
FIG. 10 is a schematic diagram of a data management system according to the embodiment.

A data management system according to the present embodiment is a system for creating the road surface information map 43. As shown in FIG. 10, the data management system includes a plurality of measurement vehicles (in the present example, a plurality of vehicles 10) and the cloud 40.

Each vehicle 10 includes a data collection device 120. The data collection device 120 includes an electronic controller 130 (hereinafter referred to as the "ECU 130"), a storage device 31, a position information obtaining device 32, a vehicle state quantity sensor 33, a preview sensor 34, a radio communication device 35, vertical acceleration sensors 36FL to 36RR, and stroke sensors 37FL to 37RR.

The ECU 130 includes a microcomputer containing a CPU 130*a*, a ROM 130*b*, a RAM 130*c*, an interface (I/F) 130*d*, etc. The ECU 130 is connected to the storage device 31, the position information obtaining device 32, the vehicle state quantity sensor 33, the preview sensor 34, and the radio communication device 35. Since the configurations of these devices and sensors have already been described, their detailed descriptions will not be repeated.

Furthermore, the ECU 130 is connected to the vertical acceleration sensors 36FL to 36RR and the stroke sensors 37FL to 37RR and receives signals output from these sensors.

The vertical acceleration sensors 36FL to 36RR detect vertical accelerations (sprung accelerations $ddz_2FL$ to $ddz_2RR$) of the body 10*a* (the sprung portion 51) at the positions of the wheels 11FL to 11RR and output signals representing the vertical accelerations. Notably, the vertical acceleration sensors 36FL to 36RR will be referred to as the "vertical acceleration sensor(s) 36" in the case where they are not required to be distinguished from one another. Similarly, the sprung accelerations $ddz_2FL$ to $ddz_2RR$ will be referred to as the "sprung acceleration(s) $ddz_2$."

The stroke sensors 37FL to 37RR are provided for the suspensions 13FL to 13RR, respectively. The stroke sensors 37FL to 37RR respectively detect the vertical strokes Hfl to Hrr of the suspensions 13FL to 13RR and output signals representing the vertical strokes. The strokes Hfl to Hrr are vertical strokes of the wheel support members 12FL to 12RR (unsprung portion 50) in relation to the body 10*a* (the sprung portion 51) at the positions of the wheels 11 shown in FIG. 1. Notably, the stroke sensors 37FL to 37RR will be referred to as the "stroke sensor(s) 37" in the case where they are not required to be distinguished from one another. Similarly, the strokes Hfl to Hrr will be referred to as the "stroke(s) H."

The ECU 130 obtains the speed Vs of the vehicle 10, the present position of the vehicle 10, and the heading direction (azimuth angle θ) of the vehicle 10 from the position information obtaining device 32. The ECU 130 determines the present position of each wheel 11 by referring to the present position of the vehicle 10, the heading direction (azimuth angle θ) of the vehicle 10, and the above-described positional relationship data. Furthermore, the ECU 130 obtains the sprung acceleration $ddz_2$ from each of the vertical acceleration sensors 36 and obtains the stroke H from each of the stroke sensors 37.

The ECU 130 transmits a predetermined time series data (hereinafter referred to as "sensing data") to the server 41 via the radio communication device 35. The sensing data includes time series data of the position of the wheel 11, time series data of the speed Vs, time series data of the sprung acceleration $ddz_2$, and time series data of the stroke H. Notably, in the sensing data, the position of the wheel 11, the speed Vs, the sprung acceleration $ddz_2$, and the stroke H are added with pieces of information representing times when these values were detected.

(Data Creation Routine)

Every time a predetermined time elapses, the CPU of the server 41 (hereinafter referred to as the "CPU2") executes a data creation routine shown by a flowchart in FIG. 11.

Notably, by executing an unillustrated routine every time a predetermined time elapses, the CPU2 receives sensing data from each of the plurality of vehicles 10 and accumulates the received sensing data in the storage device 42.

Figure 11:
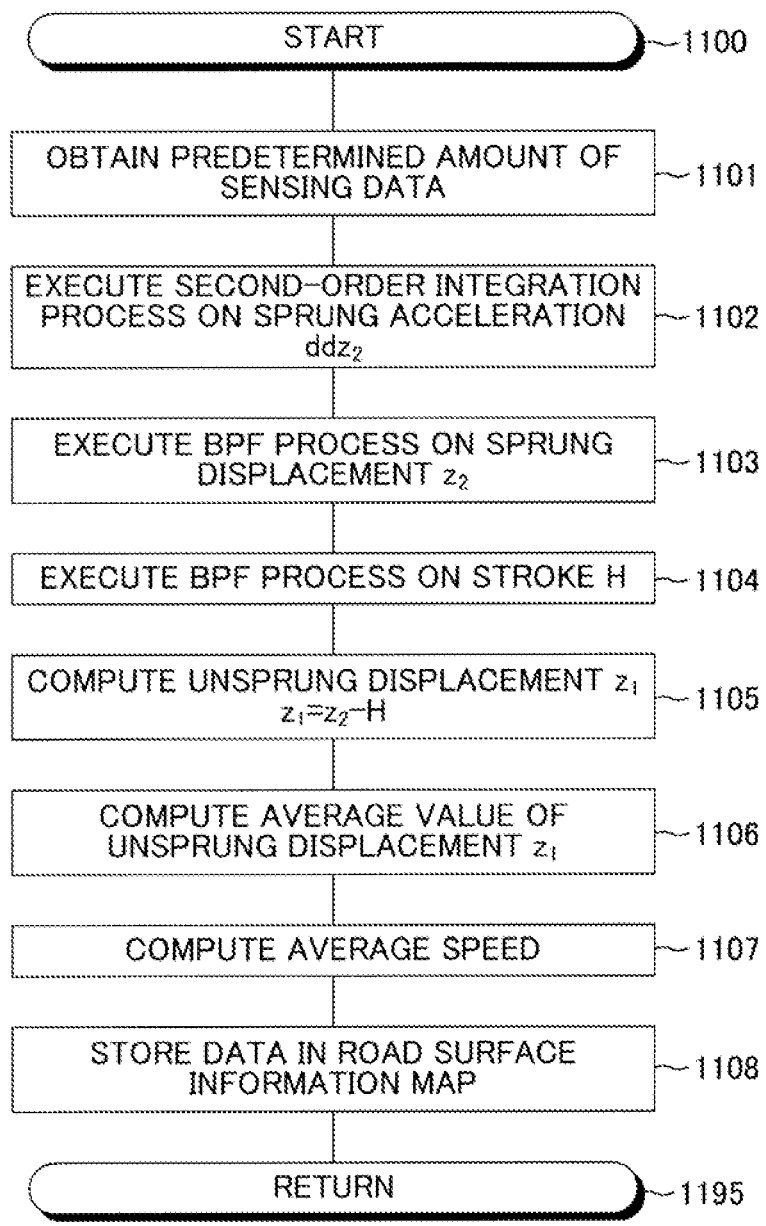
FIG. 11 is a flowchart representing a "data creation routine" executed by a CPU of a server (41) according to the embodiment.

When a predetermined timing has come, the CPU2 starts the process from step 1100 of FIG. 11, executes step 1101 to step 1108 in this order, and then proceeds to step 1195 so as to end the current execution of the present routine.

Step 1101: The CPU2 obtains a predetermined amount of sensing data from the storage device 42.

Step 1102: The CPU2 produces time series data of the sprung displacement $z_2$ by executing a second-order integration process on the time series data of the sprung acceleration $ddz_2$.

Step 1103: The CPU2 executes a band-pass filter process (hereinafter referred to as the "BPF process") on the time series data of the sprung displacement $z_2$. The BPF process allows passage of only components in a particular frequency band. As a result of the BPF process, time series data of the sprung displacement $z_2$ from which components outside the particular frequency band have been removed are produced, The above-described particular frequency band may be set to a frequency band selected to contain at least the resonance frequency of the sprung portion. In the present example, the particular frequency band ranges from a lower limit cutoff frequency fd1 to an upper limit cutoff frequency fd2. The lower limit cutoff frequency fd is set to a frequency which is lower than the resonance frequency of the sprung portion. The upper limit cutoff frequency fd2 is set to a frequency which is lower than the resonance frequency of the unsprung portion and higher than the resonance frequency of the sprung portion.

The BPF process is performed by, for example, a zero-phase filter process. Namely, the CPU2 performs on the time series data of the sprung displacements $z_2$ both a process performed in the forward direction on the time axis (a BPF process in which the time series data is processed from the first value toward the last value) and a process performed in the backward direction on the time axis (a BPF process in which the time series data is processed from the last value toward the first value), and adds the results of the processes together for averaging. It is known that, in such a zero-phase filter process, phase delay due to filtering does not occur. Notably, the BPF process may be performed by using FFT (Fast Fourier Transform).

Step 1104: The CPU2 executes the above-described BPF process on the time series data of the stroke H. As a result of the BPF process, time series data of the stroke H from which components outside the particular frequency band have been removed are produced. As in the above-described case, this BPF process is performed by the zero-phase filter process. Notably, the BPF process may be performed by using FFT Step 1105: The CPU2 produces time series data of the unsprung displacement $z_1$ by subtracting the BPF processed stroke H from the BPF processed sprung displacement $z_2$.

Step 1106: The CPU2 computes the average value of the unsprung displacement $z_1$. The CPU2 accumulatively stores a piece of information regarding the unsprung displacement $z_1$ in the storage device 42 for each position (namely, position of the wheel 11) on the road surface. The CPU2 computes the average value of the unsprung displacement $z_1$ on the basis of the information regarding the past unsprung displacements $z_1$ accumulatively stored in the storage device 42 and the unsprung displacement $z_1$ computed from the sensing data at the present point in time. Notably, the CPU2 may compute the weighted average of the unsprung displacements $z_1$. For example, the CPU2 may compute the weighted average of the unsprung displacement $z_1$ by imparting a larger weight to the unsprung displacement $z_1$ contained in the sensing data at the present point in time.

Step 1107: The CPU2 computes the average value of the speed Vs (average speed) for each position of the wheel 11. For example, the CPU2 accumulatively stores a piece of information regarding the speed Vs in the storage device 42 for each position (namely, position of the wheel 11) on the road surface. The CPU2 computes the average value of the speed Vs on the basis of the information regarding the past speeds Vs accumulatively stored in the storage device 42 and the speed Vs contained in the sensing data at the present point in time.

Step 1108: The CPU2 establishes relationships among the position of the wheel 11, the average value of the unsprung displacement $z_1$ computed in step 1106, and the average speed computed in step 1107. Subsequently, the CPU2 stores the combination of "the position of the wheel 11, the unsprung displacement $z_1$, and the average speed" in the road surface information map 43.

By virtue of this configuration, the server 41 can create the road surface information map 43 on the basis of the sensing data transmitted from the vibration damping control apparatus 20 (the ECU 30). Thus, the server 41 can provide the road surface information map 43 to the vehicle 10 in response to a request from the vibration damping control apparatus 20 (the ECU 30).

The present disclosure is not limited to the above-described embodiment, and various modifications can be employed within the range of the present disclosure.

(First modification)

In the case where the CPU1 executes the first process or the second process in the routine of FIG. 9, the CPU1 may execute the following process in step 910. In the case where the CPU1 has executed the first process (low-pass filter process) on the first time series change data of the unsprung displacement $z_1$, a phase delay occurs in the first time series change data of the unsprung displacement $z_1$. Accordingly, the CPU1 may change the advance read time (tpf or tpr) by an amount determined in consideration of the phase shift occurring as a result of the first process. The CPU1 obtains the preview information (the unsprung displacement $z_1$ at the predicted passage position of the wheel 11$i$), by using the above-described changed advance read time, from "the first time series change data of the unsprung displacement $z_1$" having been subjected to the first process.

For example, in the case where the first cutoff frequency fc1 is 10 Hz, a phase delay corresponding to the time constant (15.9 ms) occurs. Accordingly, the CPU1 changes the advance read time (tpf or tpr) by an amount corresponding to the time constant (namely, elongates the advance read time (tpf or tpr) by an amount corresponding to the time constant). The CPU1 obtains the preview information from "the first time series change data of the unsprung displacement $z_1$" having been subjected to the first process, by using the advance read time having been changed by the amount corresponding to the time constant. Specifically, the CPU1 computes an advance read distance by multiplying the speed Vs by the advance read time having been changed by the amount corresponding to the time constant. The CPU1 determines, as the predicted passage position, a position that is shifted forward from the present position of the wheel 11$i$ by the advance read distance along the predicted route. The CPU1 obtains the unsprung displacement $z_1$ at the predicted passage position of the wheel 11$i$ from "the first time series change data of the unsprung displacement $z_1$" having been subjected to the first process.

Meanwhile, in the case where the CPU1 has executed the second process (high-pass filter process) on the first time series change data of the unsprung displacement $z_1$, a phase advance occurs in the first time series change data of the unsprung displacement $z_1$. Accordingly, the CPU1 may change the advance read time (tpf or tpr) by an amount determined in consideration of the phase shift occurring as a result of the second process. For example, as in the above-described case, the CPU1 changes the advance read time (tpf or tpr) by an amount corresponding to the time constant (namely, shortens the advance read time (tpf or tpr) by the amount corresponding to the time constant). As in the above-described case, the CPU1 obtains the preview information (the unsprung displacement $z_1$ at the predicted passage position of the wheel 11$i$) from "the first time series change data of the unsprung displacement $z_1$" having been subjected to the second process, by using the advance read time having been changed by the amount corresponding to the time constant. Notably, the amount by which the advance read time is changed is not limited to the above-described example (the amount corresponding to the time constant). The CPU1 may execute other processes so long as the CPU1 can elongate or shorten the advance read time in consideration of the phase shift.

(Second Modification)

In the routine of FIG. 9, step 909 may be omitted. In this case, when the CPU1 makes a "No" determination in step 907, the CPU1 proceeds directly to step 910. Of the first time series change data of the unsprung displacement $z_1$, components (waves) in a low frequency band (for example, the frequency band ranging from the frequency fb_low to the frequency fa_low) have a smaller influence on the vibration of the sprung portion 51, as compared with components (waves) in a high frequency band. Accordingly, the CPU1 may be configured not to execute the second process on the first time series change data of the unsprung displacement $z_1$.

(Third Modification)

The CPU1 may execute a process for changing the first cutoff frequency fc1 in the first process in such a manner that the larger the difference dv1 (=Vdf−Th1) between the value Vdf and the first threshold Th1, the lower the first cutoff frequency fc1 in the first process. As the difference dv1 increases, the width of the frequency band (for example, the frequency band ranging from the frequency fb_high to the frequency fa_high) of vibrations which cannot be suppressed by the preview vibration damping control increases. By virtue of this configuration, in the first time series change data of the unsprung displacement $z_1$, components within a wider high frequency band can be reduced or removed through the first process, in a different example, in the case where the difference dv1 is greater than a predetermined value, the CPU1 may increase, by changing the order number of the low-pass filter process, the degree to which components within a frequency band higher than the first cutoff frequency fc1 are reduced.

The CPU1 may execute a process for changing the second cutoff frequency fc2 in the second process in such a manner that the larger the difference dv1(=Vdf−Th1) between the value Vdf and the first threshold Th1, the higher the second cutoff frequency fc2 in the second process. By virtue of this configuration, in the first time series change data of the unsprung displacement $z_1$, components within a wider low frequency band can be reduced or removed through the second process. In a different example, in the case where the difference dv1 is greater than the predetermined value, the CPU1 may increase, by changing the order number of the high-pass filter process, the degree to which components within a frequency band lower than the second cutoff frequency fc2 are reduced. By virtue of the above-described configuration, it is possible to further reduce the possibility that excess energy is consumed by the active actuator 17*i*, and it is possible to further reduce the possibility that the vibration of the sprung portion 51 increases.

(Fourth Modification)

The CPU1 may set the first cutoff frequency fc1 in the first process and the second cutoff frequency fc2 in the second process in accordance with the speed Vs of the vehicle 10 at the present. The ROM 30*b* stores, on a speed by speed basis, information regarding the frequency band of vibrations that can be suppressed by the preview vibration damping control. The CPU1 sets the first cutoff frequency fc1 in the first process and the second cutoff frequency fc2 in the second process in accordance with the information stored in the ROM 30*b*. For example, it is assumed that, in a situation in which the vehicle 10 is traveling at the speed Vc, the frequency band of vibrations that can be suppressed by the preview vibration damping control ranges from the frequency fc_low to the frequency fc_high. The CPU1 sets the first cutoff frequency fc1 to the frequency fc_high. The CPU1 sets the second cutoff frequency fc2 to the frequency fc_low.

(Fifth Modification)

The first cutoff frequency fc1 may be a frequency equal to or lower than the upper limit cutoff frequency fd2 of the BPF process executed when the road surface information map 43 is created. The second cutoff frequency fc2 may be a frequency equal to or higher than the lower limit cutoff frequency fd1 of the BPF process executed when the road surface information map 43 is created.

(Sixth Modification)

In the case where the first condition is satisfied, the CPU1 may determine whether or not a second condition is satisfied. The second condition is satisfied when the value Vdf (=|Vs−Vs_av|) is equal to or greater than a predetermined second threshold Th2. The second threshold Th2 is greater than the first threshold Th1. In the case where the second condition is satisfied, the CPU1 may execute a process for making the target control force Fcti smaller as compared with the case where the second condition is not satisfied. Specifically, the CPU1 sets the gain ($\beta$f or $\beta$r) in expression (8) or (9) for computing the target control force Fcti to a smaller value. For example, in the case where the second condition is satisfied, the CPU1 may set the gain ($\beta$f or $\beta$r) to zero. By virtue of this configuration, in the case where the second condition is satisfied, since the target control force Fcti becomes smaller, it is possible to further reduce the possibility that excess energy is consumed by the active actuator 17*i*.

Notably, the CPU1 may change the second threshold Th2 in accordance with whether the speed Vs is higher or lower than the average speed Vs_av. For example, the second threshold Th2 in the case where the speed Vs is higher than the average speed Vs_av is greater than the second threshold Th2 in the case where the speed Vs is lower than the average speed Vs_av.

(Seventh Modification)

In the routine of FIG. 9, step 906 (namely, determination as to whether or not the first condition is satisfied) may be omitted. In the case where the speed Vs is higher than the average speed Vs_av, the CPU1 proceeds to step 908 and executes the first process. In the case where the speed Vs is lower than the average speed Vs_av, the CPU1 proceeds to step 909 and executes the second process. In this configuration, in the case where the speed Vs is the same as the average speed Vs_av, the CPU1 proceeds to step 910 without executing the first process or the second process.

(Eighth Modification)

The road surface information map 43 is not limited to the above-described example. The road surface information map 43 may be data in a different format so long as the road surface information map 43 is a set of data in which the position information, the road surface displacement related value, and the speed information are related to one another. Instead of the average value of the unsprung displacement $z_1$, the latest unsprung displacement $z_1$ obtained by the measurement vehicle may be used as the road surface displacement related value. The speed information may be the speed of the measurement vehicle at the time when the latest unsprung displacement $z_1$ was obtained.

In a different example, the road surface information map 43 may be data shown in FIG. 12. In the road surface information map 43, the road surface displacement related value (the unsprung displacement $z_1$) and the average speed may be set for each of a plurality of speed ranges. The road surface Information map 43 shown in FIG. 12 is a set of data in which position information (X, Y) 44*a*, speed ranges 44*b*, unsprung displacements ($z_1$) 44*c*, and average speeds 44*d* are related to one another. The position information (X, Y) 44*a* represents a position on a road surface.

The speed ranges 44*b* are pieces of information representing ranges of the speed Vs (speed zones). In the present example, a possible range Vra of the speed Vs (namely, a range between zero and a rated maximum vehicle speed Vmax) is divided into four ranges Vb1 to Vb4. The first range Vb1 represents a range of speed equal to or higher than zero and lower than a first speed Vs1. The second range Vb2 represents a range of speed equal to or higher than the first speed Vs1 and lower than a second speed Vs2. The third range Vb3 represents a range of speed equal to or higher than the second speed Vs2 and lower than a third speed Vs3. The fourth range Vb4 represents a range of speed equal to or higher than the third speed Vs3 and not higher than the maximum vehicle speed Vmax. Notably, the first speed Vs1, the second speed Vs2, the third speed Vs3, and the maximum vehicle speed Vmax satisfy a relation of Vs1<Vs2<Vs3<Vmax. Notably, the range Vra of the speed Vs may be divided into at least two ranges.

Each of the unsprung displacements ($z_1$) 44c is an unsprung displacement $z_1$ obtained when the measurement vehicle traveled at a speed within a speed range 44b and passed the position represented by the position information 44a. The average speed 44d is the average value of the speed at the time when the measurement vehicle traveled at the speed within the speed range 44b and passed the position represented by the position information 44a.

In this configuration, the CPU1 executes the process as described below. For example, it is assumed that the speed Vs of the vehicle 10 is Vsn within the second range Vb2. In step 904 of the routine of FIG. 9, the CPU1 obtains a set of unsprung displacements $z_1$ related to the speed range 44b (=Vb2) corresponding to the speed Vsn as "first time series change data of the unsprung displacement $z_1$." Furthermore, in step 905, the CPU1 obtains the average speed 44d related to the speed range 44b (=Vb2) corresponding to the speed Vsn. For example, in the case where the predicted passage position of the wheel 11i is (X1, Y1), the CPU1 obtains the average speed 44d (=Vs_b).

By virtue of this configuration, in the road surface information map 43, the unsprung displacements ($z_1$) 44c and the average speeds 44d are managed for each of the speed ranges 44b (i.e., managed on a speed range by speed range basis). The CPU1 can obtain the unsprung displacement ($z_1$) 44c and the average speed 44d appropriate for the speed Vs from the road surface information map 43. Accordingly, it is possible to further reduce the possibility that excess energy is consumed by the active actuator 17i, and it is possible to further reduce the possibility that the vibration of the sprung portion 51 increases.

(Ninth Modification)

The ECU 30 may be connected to the preview sensor 34, the vertical acceleration sensors 36FL to 36RR, and the stroke sensors 37FL to 37RR, and receive signals output from these sensors. In this configuration, the ECU 30 may obtain the road surface displacement related value on the basis of the signals from these sensors while the vehicle 10 is traveling. The ECU 30 may compute the unsprung displacement $z_1$ by subtracting the stroke H from the sprung displacement $z_2$. The ECU 30 may obtain the road surface displacement $z_0$ from the preview sensor 34. The ECU 30, the preview sensor 34, the vertical acceleration sensor 36, and the stroke sensor 37 are components for obtaining the road surface displacement related value and may be referred to as the "information obtaining apparatus for obtaining the road surface displacement related value" in some cases.

In the above-described configuration, the CPU1 of the ECU 30 may compute the target control force Fct in accordance with the following expression (10), where $G_1$ and $G_2$ are gains. F1 is a control force computed by using the preview information and is computed in accordance with the following expression (11). Expression (11) is the same as expression (7). In the following description, F1 will be referred to as the "first target control force FR."

$$Fct = G_1 \cdot F1 + G_2 \cdot F2 \tag{10}$$

$$F1 = \beta_2 \times z_1 \tag{11}$$

F2 includes target control force for feedforward control and/or target control force for feedback control and will be referred to as the "second target control force F2" in the following description. The second target control force F2 includes at least one of F2_a of expression (12), F2_b of expression (13), and F2_c of expression (14). F2_a is the target control force for feedforward control and computed by using the road surface displacement $z_0$ ahead of the vehicle 10 which was obtained by the preview sensor 34. $\beta_3$ is a gain. F2_b is the target control force for feedback control for damping the vibration of the sprung portion 51. F2_b is determined to make $dz_2$ zero. F2_c is the target control force for feedforward control of the rear wheel 11R. Namely, since the rear wheel 11R conceivably follows the route of the front wheel 11F, the CPU1 may execute the preview vibration damping control for the rear wheel 11R by using the unsprung displacement $z_1$ computed for the passage position of the front wheel 11F. F2_c is computed by applying to expression (14) the unsprung displacement $z_1$ computed for the passage position of the front wheel 11F. $\beta_4$ is a gain.

$$F2\_a = \beta_3 \times z_0 \tag{12}$$

$$F2\_b = \gamma_0 \cdot dz_2 \tag{13}$$

$$F2\_c = \beta_4 \times z_1 \tag{14}$$

Accordingly, in the case where the wheel 11i is the front wheel 11F, the second target control force F2 may be one of F2_a of expression (12) and F2_b of expression (13), or the sum of F2_a and F2_b. In the case where the wheel 11i is the rear wheel 11R, the second target control force F2 may be one of F2_a of expression (12), F2_b of expression (13), and F2_c of expression (14), or the sum of two or more of F2_a, F2_b, and F2_c.

In a certain example, in the case were the first condition is not satisfied, the CPU1 may set the gain $G_1$ to be larger than the gain $G_2$. For example, in the case where the first condition is not satisfied, the CPU1 may set the gain $G_2$ to zero. It is possible to enhance the vibration damping performance by increasing the component of the first target control force F1 in the target control force Fct.

In another example, the CPU1 may set the gain $G_2$ for the case where the first condition is satisfied to be greater than the gain $G_2$ for the case where first condition is not satisfied. It is possible to prevent the vibration of the sprung portion 51 from increasing by increasing the component of the second target control force F2 in the target control force Fct.

In the case where the second condition is satisfied, the CPU1 may set the gain $G_1$ to zero. It is possible to suppress the vibration of the sprung portion 51 by the second target control force F2 in the target control force Fct, while preventing the vibration of the sprung portion 51 from increasing.

In a different example, the CPU1 may change either or both of the gain $G_1$ and the gain $G_2$ depending on whether or not the first condition (or the second condition) is satisfied.

Notably, the expression used for computing F2_b for feedback control is not limited to expression (13) and may be an expression which includes at least one of the term of the sprung displacement $z_2$, the term of the sprung speed $dz_2$, the term of the sprung acceleration $ddz_2$, the term of the unsprung displacement $z_1$, and the term of the unsprung speed $dz_1$. For example, the CPU1 may compute F2_b in accordance with the following expression (15), where each of $\gamma_1$, $\gamma_2$, $\gamma_3$, $\gamma_4$, and $\gamma_5$ is a gain.

$$F2\_b = \gamma_1 \times ddz_2 + \gamma_2 \times dz_2 + \gamma_3 \times z_2 + \gamma_4 \times dz_1 + \gamma_5 \times z_1 \tag{15}$$

(Tenth Modification)

The CPU2 of the server 41 may execute a process of estimating either or both of the time series data of the unsprung displacement $z_1$ and the time series data of the unsprung speed $dz_1$ on the basis of the sensing data by using an observer. The CPU2 may produce the time series data of the road surface displacement $z_0$ by executing the above-described BPF process on the time series data of the road surface displacement $z_0$ detected by the preview sensor 34. Furthermore, the CPU2 may produce the time series data of the road surface displacement speed $dz_0$ by executing a differential process and a BPF process on the time series data of the road surface displacement $z_0$. Accordingly, the road surface information map 43 may contain, as the road surface displacement related value, at least one of the road surface displacement $z_0$, the road surface displacement speed $dz_0$, the unsprung displacement $z_1$, and the unsprung speed $dz_1$.

(Eleventh Modification)

The road surface information map 43 may be stored in the storage device 31 of the vehicle 10 instead of being stored in the storage device 42 of the cloud 40. The ECU 130 may create the road surface information map 43 in the storage device 31 by executing the process of the routine of FIG. 11. In a different example, the ECU 130 may receive the road surface information map 43 from other vehicles 10 and store the road surface information map 43 in the storage device 31.

(Twelfth Modification)

The ECU 30 may obtain the unsprung displacement ($z_1$) 43b from the road surface information map 43 as follows. First, the ECU 30 transmits the predicted passage position (pf1 or pr1) to the server 41. The server 41 obtains the unsprung displacement ($z_1$) 43b at the predicted passage position from the road surface information map 43 stored in the storage device 42 and transmits the unsprung displacement ($z_1$) 43b to the ECU 30. The ECU 30 receives the unsprung displacement ($z_1$) 43b from the server 41 and stores the received unsprung displacement ($z_1$) 43b in the RAM 30c.

(Thirteenth Modification)

The suspensions 13FL to 13RR may be suspensions of any type so long as the suspensions allow vertical displacements of the wheels 11FL to 11RR in relation to the body 10a. Furthermore, the suspension springs 16FL to 16RR may be springs of any type such as compression coil springs, air springs, etc.

(Fourteenth Modification)

In the above-described embodiment, the active actuator 17 is used as a control force generating apparatus. However, the control force generating apparatus is not limited thereto. Namely, the control force generating apparatus may be any actuator which can adjustably generate a control force in the vertical direction for damping the vibration of the sprung portion 51, on the basis of a control instruction containing the target control force.

Furthermore, the control force generating apparatus may be an active stabilizer apparatus (not shown). The active stabilizer apparatus includes a front wheel active stabilizer and a rear wheel active stabilizer. When the front wheel active stabilizer generates a control force (left front wheel control force) in the vertical direction between the sprung portion 51 and the unsprung portion 50 which correspond to the left front wheel 11FL, the front wheel active stabilizer generates a control force (right front wheel control force) in the direction opposite the left front wheel control force between the sprung portion 51 and the unsprung portion 50 which correspond to the right front wheel 11FR. Similarly, when the rear wheel active stabilizer generates a control force (left rear wheel control force) in the vertical direction between the sprung portion 51 and the unsprung portion 50 which correspond to the left rear wheel 11RL, the rear wheel active stabilizer generates a control force (right rear wheel control force) in the direction opposite the left rear wheel control force between the sprung portion 51 and the unsprung portion 50 which correspond to the right rear wheel 11RR. The structure of the above-described active stabilizer apparatus is well known and is incorporated into the specification of the present application by referring to Japanese Patent Application Laid-Open (kokai) No. 2009-96366. Notably, it is sufficient that the active stabilizer apparatus includes at least one of the front wheel active stabilizer and the rear wheel active stabilizer.

The control force generating apparatus may be an apparatus which generates the control force Fc in the vertical direction by utilizing the geometry of the suspensions 13FL to 13RR; specifically, by increasing and decreasing braking and driving forces applied to the wheels 11 of the vehicle 10. The structure of such an apparatus is well known and is incorporated into the specification of the present application by referring to Japanese Patent Application Laid-Open (kokai) No. 2016-107778, etc. The ECU 30 computes the braking and driving forces for generating the control force Fc corresponding to the target control force Fct by a well known method.

Such an apparatus includes a drive apparatus (for example, in-wheel motors) for applying drive forces to the wheels 11 and a braking apparatus for applying braking forces to the wheels 11. Notably, the drive apparatus may be a motor, an engine, or the like which applies drive forces to the front wheels, the rear wheels, or the four wheels. Furthermore, it is sufficient that the control force generating apparatus includes at least one of the drive apparatus and the braking apparatus.

Alternatively, the control force generating apparatus may be damping-force-variable type shock absorbers 15FL to 15RR. In this case, the ECU 30 controls the damping coefficients C of the shock absorbers 15FL to 15RR in such a manner that the damping forces of the shock absorbers 15FL to 15RR change by an amount corresponding to the target control force Fct.

What is claimed is:

1. A vibration damping control apparatus for a vehicle, comprising:
a speed obtainment section configured to obtain information regarding speed of the vehicle;
a control force generating apparatus configured to generate control force in a vertical direction for damping vibration of a sprung portion of the vehicle, the control force being applied between at least one wheel and a portion of a body of the vehicle, which portion corresponds to a position of the wheel; and
a control unit configured
to compute a predicted route that the wheel is predicted to pass,
to obtain first data from road surface information which is data in which relationships are established among position information representing a position on a road surface, a road surface displacement related value obtained when a measurement vehicle traveled and passed the position on the road surface, and speed information representing a speed of the measurement vehicle at the time when the measurement vehicle traveled and passed the position on the road surface, the first data representing a time series change of the road surface displacement related value on the predicted route, to obtain, from the first data, as preview information, the road surface displacement related value at a predicted passage position that the wheel is predicted to pass after elapse of an advance read time from a present point in time, to compute a target control force which is a target value of the control force by using the preview information, and to execute preview vibration damping control for controlling the control force generating apparatus on the basis of the target control force, wherein the control unit is further configured to obtain the speed Information at the predicted passage position from the road surface information, to execute a first process on the first data in the case where the speed of the vehicle at the present point in time is higher than a speed represented by the speed information, the first process being a low-pass filter process for reducing or removing components within a frequency band higher than a first cutoff frequency, and to obtain the preview information from the first data having been subjected to the first process.

2. A vibration damping control apparatus according to claim 1, wherein the control unit is configured to change the advance read time by an amount determined in consideration of a phase shift occurring as a result of the first process and obtain the preview information from the first data having been subjected to the first process by using the changed advance read time.

3. A vibration damping control apparatus according to claim 1, wherein the control unit is configured to execute the first process on the first data in the case where a first condition is satisfied and the speed of the vehicle at the present point in time is higher than the speed represented by the speed Information, the first condition being a condition that an absolute value of a difference between the speed of the vehicle at the present point in time and the speed represented by the speed information is equal to or greater than a first threshold.

4. A vibration damping control apparatus according to claim 3, wherein the control unit is configured to execute a process for changing the first cutoff frequency in such a manner that the larger the difference between the absolute value and the first threshold, the lower the first cutoff frequency in the first process.

5. A vibration damping control apparatus according to claim 3, wherein the control unit is configured such that, in the case where a second condition that the absolute value is equal to or greater than a second threshold which is greater than the first threshold is satisfied, the control unit executes a process for making the target control force smaller as compared with the case where the second condition is not satisfied.

6. A vibration damping control apparatus according to claim 1, wherein the control unit is configured to execute a second process on the first data in the case where the speed of the vehicle at the present point in time is lower than the speed represented by the speed information, the second process being a high-pass filter process for reducing or removing components within a frequency band lower than a second cutoff frequency, and to obtain the preview information from the first data having been subjected to the second process.

7. A vibration damping control apparatus according to claim 6, wherein the control unit is configured to change the advance read time by an amount determined in consideration of a phase shift occurring as a result of the second process and obtain the preview information from the first data having been subjected to the second process by using the changed advance read time.

8. A vibration damping control apparatus according to claim 6, wherein the control unit is configured to execute the second process on the first data in the case where a first condition is satisfied and the speed of the vehicle at the present point in time is lower than the speed represented by the speed information, the first condition being a condition that an absolute value of a difference between the speed of the vehicle at the present point in time and the speed represented by the speed information is equal to or greater than a first threshold.

9. A vibration damping control apparatus according to claim 8, wherein the control unit is configured to execute a process for changing the second cutoff frequency in such a manner that the larger the difference between the absolute value and the first threshold, the higher the second cutoff frequency in the second process.

10. A vibration damping control apparatus according to claim 8, wherein the control unit is configured such that, in the case where a second condition that the absolute value is equal to or greater than a second threshold which is greater than the first threshold is satisfied, the control unit executes a process for making the target control force smaller as compared with the case where the second condition is not satisfied.

11. A vibration damping control apparatus according to claim 1, wherein, in the road surface information, the road surface displacement related value and the speed information are set for each of a plurality of speed ranges.

12. A vibration damping control apparatus according to claim 1, wherein the road surface displacement related value includes at least one of road surface displacement representing displacement of the road surface in the vertical direction, road surface displacement speed representing a derivative value of the road surface displacement with respect to time, unsprung displacement representing displacement of an unsprung portion of the vehicle in the vertical direction, and unsprung speed representing a derivative value of the unsprung displacement with respect to time.

* * * * *